(12) United States Patent
Suzuki et al.

(10) Patent No.: US 9,403,232 B2
(45) Date of Patent: Aug. 2, 2016

(54) ARC WELDING APPARATUS, CONSTANT VOLTAGE CHARACTERISTIC WELDING POWER SOURCE, AND METHOD FOR PERFORMING ARC WELDING

(71) Applicant: Kobe Steel, Ltd., Kobe-shi (JP)

(72) Inventors: Reiichi Suzuki, Fujisawa (JP); Kei Yamazaki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 403 days.

(21) Appl. No.: 13/933,484

(22) Filed: Jul. 2, 2013

(65) Prior Publication Data

US 2014/0116999 A1 May 1, 2014

(30) Foreign Application Priority Data

Oct. 31, 2012 (JP) .................................. 2012-239986

(51) Int. Cl.
*B23K 9/02* (2006.01)
*B23K 9/09* (2006.01)
*B23K 9/025* (2006.01)
*B23K 9/028* (2006.01)
*B23K 9/095* (2006.01)
*B23K 9/10* (2006.01)
*B23K 9/173* (2006.01)
(Continued)

(52) U.S. Cl.
CPC . *B23K 9/09* (2013.01); *B23K 9/025* (2013.01); *B23K 9/0209* (2013.01); *B23K 9/0216* (2013.01); *B23K 9/0282* (2013.01); *B23K 9/095* (2013.01); *B23K 9/1043* (2013.01); *B23K 9/173* (2013.01); *B23K 9/1735* (2013.01); *B23K 9/23* (2013.01); *B23K 37/0217* (2013.01); *B23K 37/0276* (2013.01); *B23K 37/0282* (2013.01); *B23K 2201/06* (2013.01); *B23K 2201/18* (2013.01)

(58) Field of Classification Search
CPC .......... B23K 9/0213; B23K 9/09; B23K 9/12; B23K 9/126; B23K 9/133
USPC ................................................ 219/124.1, 126
See application file for complete search history.

(56) References Cited

U.S. PATENT DOCUMENTS 5,676,867 A * 10/1997 Van Allen ............... B23K 9/205
219/130.1
2008/0210677 A1* 9/2008 Nakamura ........... B23K 9/0213
219/137 R

FOREIGN PATENT DOCUMENTS

JP 52-119450 A 10/1977
JP 57-22875 A 2/1982
(Continued)

*Primary Examiner* — Brian Jennison
(74) *Attorney, Agent, or Firm* — Oblon, McClelland, Maier & Neustadt, L.L.P.

(57) ABSTRACT

An arc welding apparatus includes a lifting motor. A speed adjustment circuit controls the lifting motor such that the rising speed of the welder decreases if a current of the welding power source is smaller than a set value, or increases if the value of the current is larger than the set value. A voltage adjustment circuit controls the welding power source such that the voltage increases if the number of times that the voltage falls below a determination voltage is larger than a set number of times or if periods for which the voltage remains below the determination voltage are longer than a set time, or decreases if the number of times that the voltage falls below a determination voltage is smaller than a set number of times or if periods for which the voltage remains below the determination voltage is shorter than a set time.

9 Claims, 12 Drawing Sheets

(51) Int. Cl.
B23K 9/23 (2006.01)
B23K 37/02 (2006.01)

(56) References Cited

FOREIGN PATENT DOCUMENTS

| JP | 58-141855 A | 8/1983 |
| JP | 59-130689 | 7/1984 |
| JP | 7-185811 A | 7/1995 |
| JP | 9-262672 A | 10/1997 |
| JP | 10-109165 A | 4/1998 |
| JP | 10-118771 A | 5/1998 |
| JP | 2003-10971 A | 1/2003 |
| JP | 2004-167600 | 6/2004 |
| JP | 3596723 | 9/2004 |
| JP | 2007-69256 A | 3/2007 |
| JP | 2012-11407 A | 1/2012 |

* cited by examiner

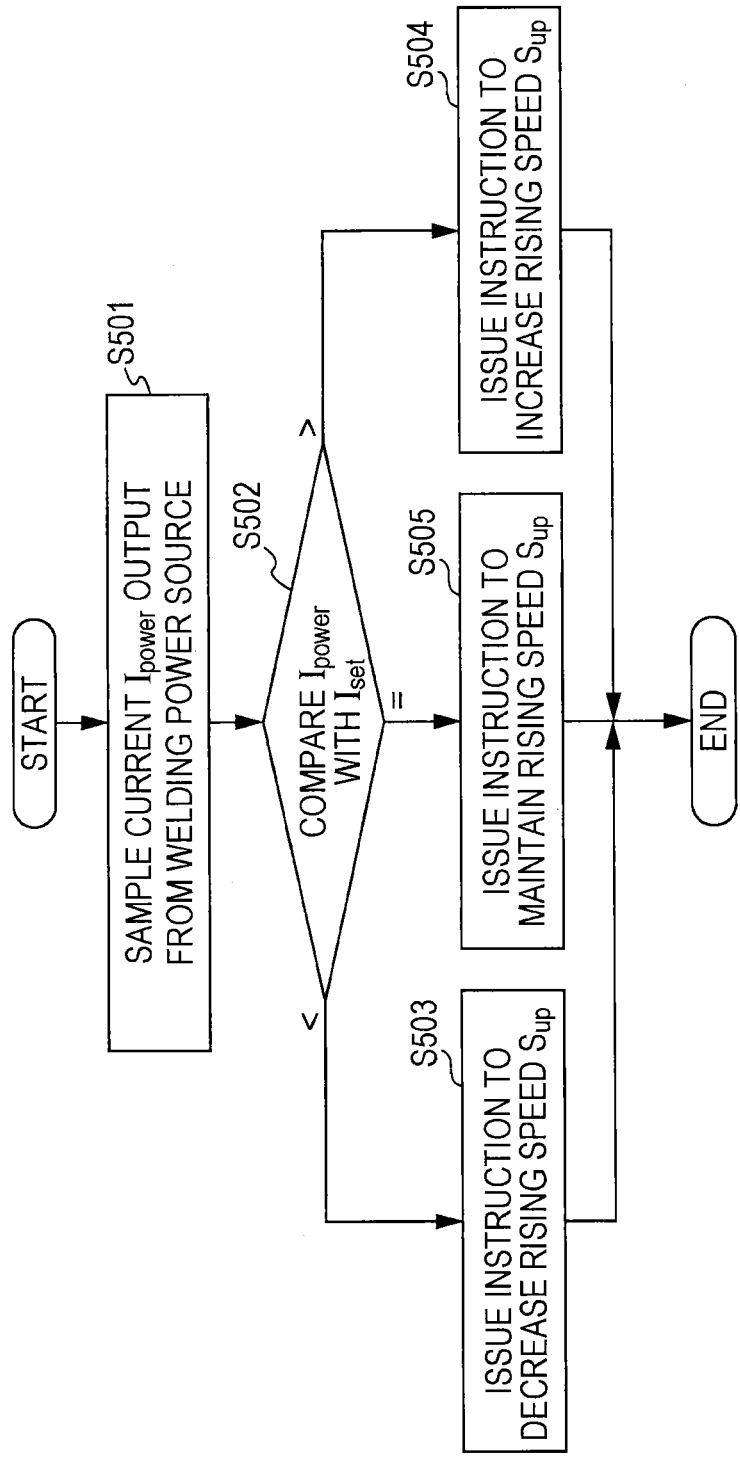

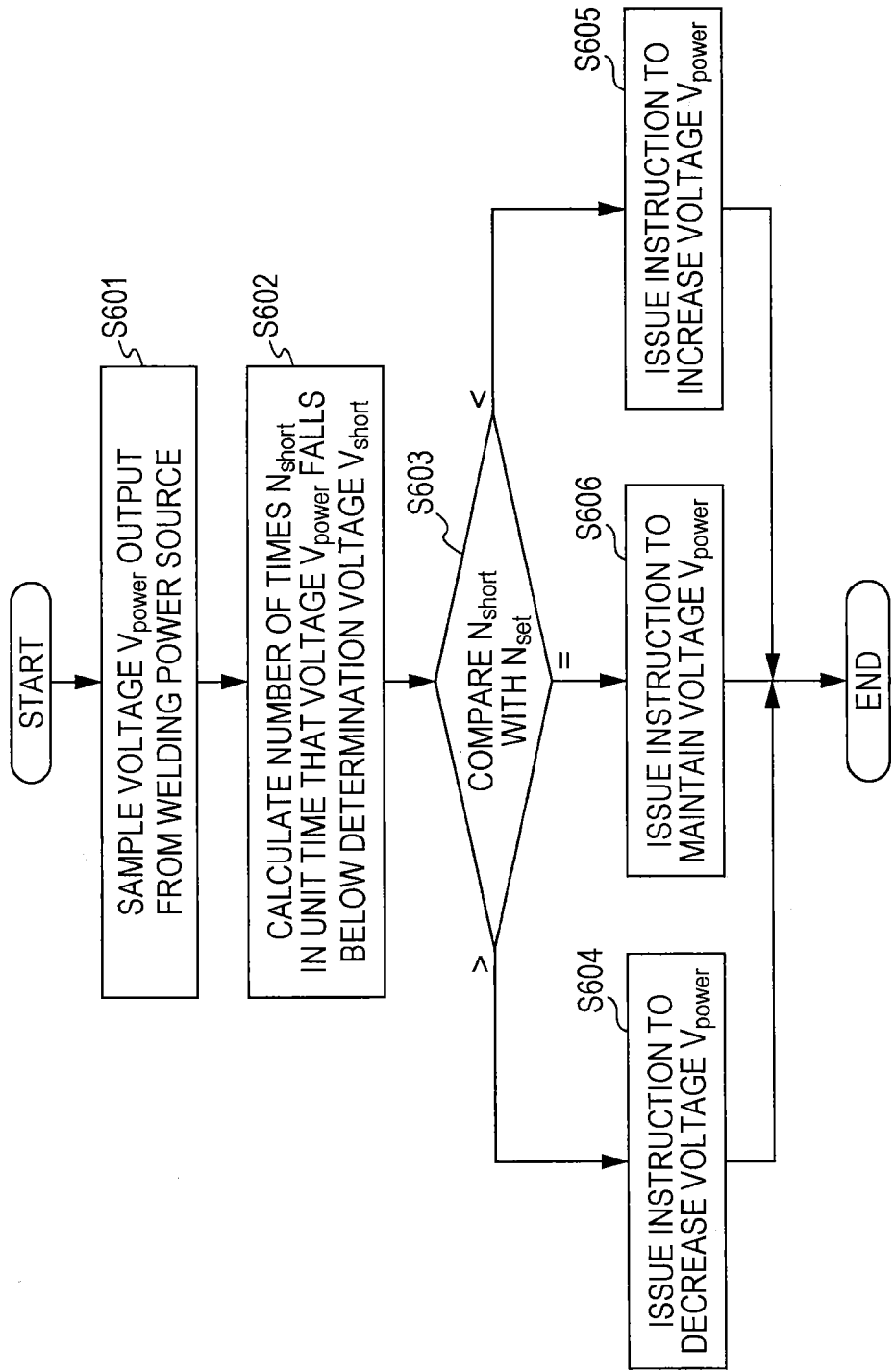

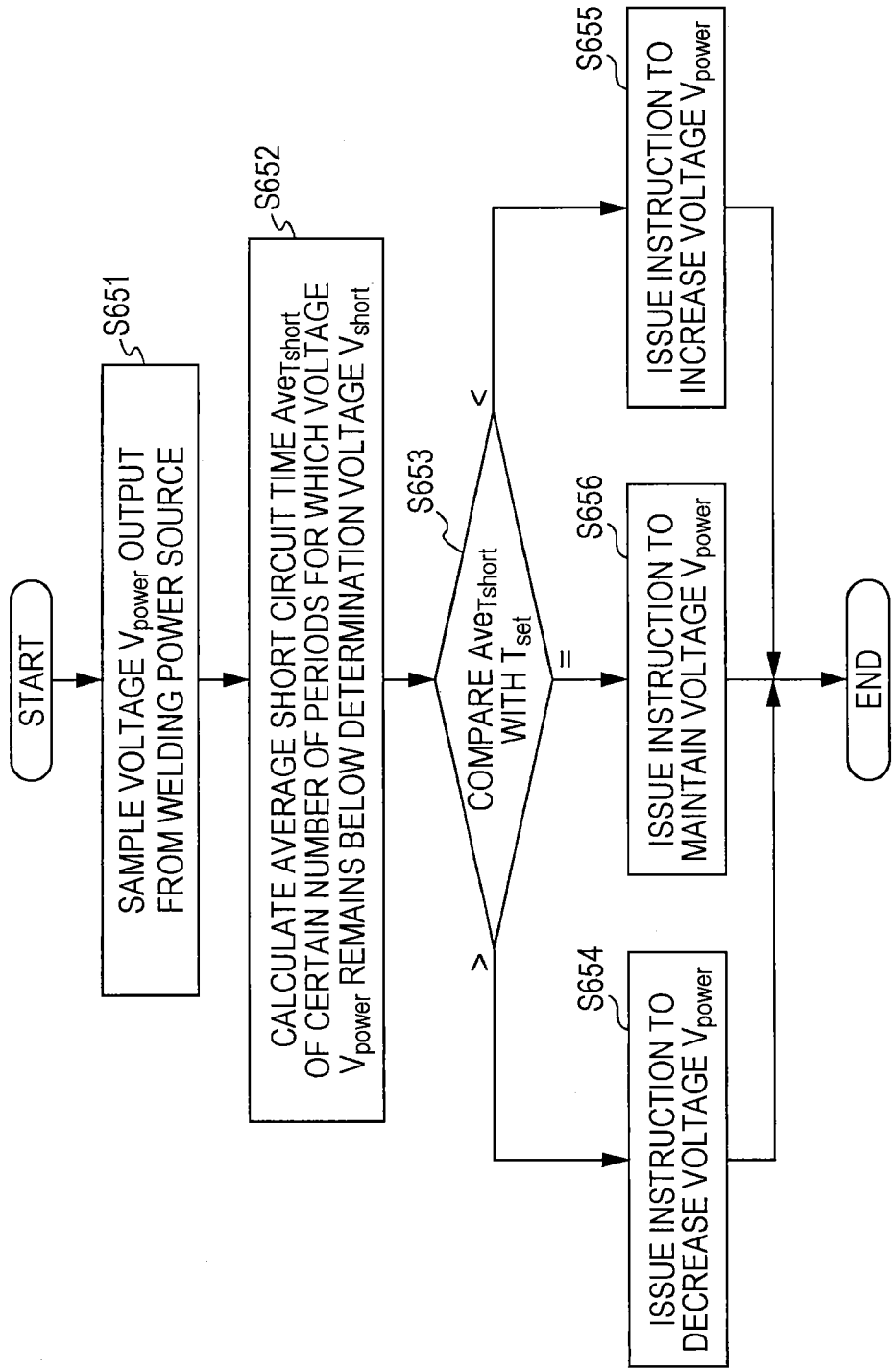

A—A

CONVECTION

B—B $\Sigma V_{cable}$: LARGE

CONVECTION
ARC VOLTAGE $V_{arc}$: LOW $\Sigma V_{cable}$: SMALL

CONVECTION
ARC VOLTAGE $V_{arc}$: HIGH

ARC WELDING APPARATUS, CONSTANT VOLTAGE CHARACTERISTIC WELDING POWER SOURCE, AND METHOD FOR PERFORMING ARC WELDING

BACKGROUND OF THE INVENTION

1. Field of the Invention

The present invention relates to an arc welding apparatus, a constant voltage characteristic welding power source, and a method for performing arc welding.

2. Description of the Related Art

A type of arc welding specialized in vertical-up welding in which high efficiency is obtained by filling a surface of a welding groove through a one-pass operation is called "electrogas arc welding" including an apparatus, and has been widely put into practice (for example, refer to Japanese Unexamined Patent Application Publication No. 59-130689, Japanese Patent No. 3596723, and Japanese Unexamined Patent Application Publication No. 2004-167600).

In the basic mechanism of the apparatus, a welding torch, a wire feed motor, a sliding copper plate including a gas supply port and a cooling tube, and a dedicated device (welder) including a lifting motor are mounted on a rail extending on a steel plate in a longitudinal direction of the groove, and welding is performed in the groove while lifting the welder in accordance with the rise of a surface of a molten pool.

For such welding, some methods for linking the rise of the surface of the molten pool with the rise of the dedicated device have been proposed.

In a first method, a link mechanism is not used. That is, this is a completely manual method in which the speed of the lifting motor is manually adjusted while constantly observing the surface of the molten pool. The configuration of the apparatus is the simplest, but constant observation is required. The workload is too heavy and the quality of welding obtained is too unstable to perform welding of a welding length of several meters to tens of meters.

Therefore, in order to reduce the workload and stabilize the quality of welding, an automatic rising mechanism has been proposed.

That is, a second method is a control method in which an optical sensor is mounted on the apparatus and a linkage with the rising speed of the surface of the molten pool is established by utilizing a mechanism in which the intensity of arc light changes in accordance with the rise of the surface of the molten pool.

However, this method is not stable since the arc is not always stable and affects the intensity of light and fumes (smoke) generated during the welding blocks the light irregularly.

Therefore, as a third method, a method in which feedback to the rising speed is performed using values of current may be used. This is currently the most popular method.

In this method, a constant voltage characteristic welding power source is used as a welding power source. When a wire feed rate has been determined, the constant voltage characteristic welding power source outputs a current large enough to melt a wire. The welding wire is melted by total energy of arc heat proportional to the product of the current and the potential difference of the arc (arc voltage), the electrical resistivity of the welding wire itself, a welding distance, and the product of the square of the current, and, as a result, the current and the welding distance are balanced. Here, because the welding distance becomes shorter and resistance heat decreases when the surface of the molten pool rises, the welding power source increases the output current thereof in order to supplement insufficient melting energy. Therefore, by instantly reading this increase in the output voltage and increasing the rising speed of the welder, the welding distance becomes longer again and the resistance heat increases. Because the melting energy becomes excessive, the output current is reduced, thereby suppressing the rising speed. By repeating this procedure continuously, the rise of the surface of the molten pool and the rise of the welder are linked to each other, and accordingly monitoring is no longer required.

That is, currently, only the feedback control of the current and the rising speed has been put into practice, and an arc length, which is an essential factor in the quality of welding, is not controlled at all except for the automatic control characteristic of the constant voltage power source. The automatic control characteristic of the constant voltage power source may be referred to as a function of maintaining a set arc length regardless of whether or not the set arc length is appropriate.

Voltage as a parameter in welding may be regarded as equivalent to the arc length, but in vertical-up welding of a large welding length, the arc length and the voltage need to be considered more strictly than in downhand welding or horizontal welding. This is because of differences in an arc force direction and a penetration direction.

FIGS. 11A and 11B are schematic diagrams illustrating a welding direction, the arc force direction, and the penetration direction in each welding attitude. FIG. 11A illustrates downhand welding, and FIG. 11B illustrates vertical-up welding. Hollow arrows indicate the welding directions, broken-line arrows indicate the arc force directions, and thick-solid-line arrows indicate the penetration directions.

As illustrated in FIG. 11A, in downhand welding, the arc force direction and the penetration direction in the groove are parallel to each other. Therefore, deep penetration is structurally easy to obtain, and few failures occur in penetration. Although it is known that the concentration of an arc depends on the arc length and accordingly the arc length affects the penetration, the degree of effect is small compared to that in vertical-up welding, which will be described hereinafter.

On the other hand, as illustrated in FIG. 11B, in vertical-up welding, the arc force direction and the penetration direction in a width direction of the groove are perpendicular to each other. That is, the arc force does not directly affect the penetration. In vertical-up welding, penetration in the width direction is obtained due to convection generated in the molten pool immediately below the arc. Therefore, the intensity of the convection determines the depth of penetration, and the penetration is shallow relative to input heat energy. Moreover, because the convection in the molten pool is easily affected by the distribution of arc force, small variations in the arc length cause failures in the penetration. That is, in vertical-up welding, appropriate control of the arc length is significantly important in terms of securing the quality of welding.

In the downhand welding illustrated in FIG. 11A, the penetration is generally deep when the arc length is small, whereas in the vertical welding illustrated in FIG. 11B, the penetration is deep when the arc length is large. These opposite characteristics derive from the above-described difference between their respective mechanisms.

Currently, however, the arc length and the voltage are not controlled at all as described above. Since the arc length is generally considered equivalent to the voltage, a value of voltage corresponding to a certain value of current is managed as a model condition, but a problem arising in this case is the reliability of the absolute value of voltage.

FIGS. 12A and 12B are diagrams illustrating relationships between arc voltage and a voltage loss in cables.

As illustrated in FIGS. 12A and 12B, power source output voltage $V_{power}$ output from a welding power source includes not only arc voltage $V_{arc}$, which is the potential difference of an arc, but also a voltage loss $\Sigma V_{cable}$ in secondary cables connecting the welding power source and a welding torch and the welding power source and a base metal or connecting portions ($V_{power} = V_{arc} + \Sigma V_{cable}$).

That is, in the secondary cables and the connecting portions, part of power is converted into a heat loss due to the voltage loss ($\tau V_{cable}$). The voltage loss is negligible when the secondary cables are short, but in ships, bridge piers, tanks, and the like, which are targets of the present invention, the voltage loss cannot be neglected because welding of a large welding length is performed by lifting a welder mounted with cables having a length of tens of meters while using a welding power source fixed on the ground.

For example, even when 37 V has been set as the power source output voltage $V_{power}$ that serves as a desirable welding condition, the arc voltage $V_{arc}$ varies depending on the lengths of the secondary cables. When the secondary cables are long and the voltage loss is large as illustrated in FIG. 12A, the arc voltage $V_{arc}$, which is the difference between the power source output voltage $V_{power}$ and the voltage loss, becomes low. As a result, convection in a molten pool becomes weak and penetration becomes shallow. On the other hand, when the secondary cables are short and the voltage loss is small as illustrated in FIG. 12B, the arc voltage $V_{arc}$, which is the difference between the power source output voltage $V_{power}$ and the voltage loss, becomes high. As a result, convection in a molten pool becomes strong and penetration becomes deep. Thus, it cannot be said that the penetration is controlled. Furthermore, although the penetration can be secured when the arc voltage is high, the mechanical properties of a weld metal may deteriorate when the arc voltage is excessive because the components of the weld metal become inappropriate due to significant oxidation reaction in the arc and inevitable mixing of the atmosphere in the arc.

In addition, in the case of downhand welding, even if the lengths of the secondary cables are not taken into consideration, failures in the penetration may be substantially prevented insofar as the arc is in contact with the surface of the groove, which may be adjusted by an operator during the welding. In the case of vertical welding, however, since the arc does not come into contact with the surface of the groove, it is difficult for the operator to determine whether or not appropriate penetration is being obtained. That is, even when current conditions or voltage conditions are inappropriate from the beginning, it is difficult for the operator to tell that. As a result, in the worst case, failures in the penetration and failures in the properties of the weld metal occur along the entirety of the welding length.

As described above, currently, only the control of the rising speed has been put into practice in a vertical welding apparatus, that is, only the shape of a weld portion is controlled, and the arc length and the voltage, which are two of other important welding conditions, are not controlled at all such that the arc length and the voltage become appropriate. Therefore, the stability of the penetration quality and the mechanical properties of the weld metal is substantially not controlled at all and fully dependent on the empirical intuition of the operator. For this reason, it has been desired to improve the apparatus to achieve further automation, elimination of the need for monitoring, and stabilization of quality.

In the technique disclosed in Japanese Unexamined Patent Application Publication No. 59-130689, changes in the arc length and the voltage, which is a quantitative value of the arc length, according to the rise of the surface of the molten pool are read and used to control a lifting motor, but this is the same as the above-described feedback control between changes in current and the lifting motor, and whether or not the absolute value of the arc length is appropriate is not controlled.

In addition, the techniques disclosed in Japanese Patent No. 3596723 and Japanese Unexamined Patent Application Publication No. 2004-167600, too, do not propose a method for controlling whether or not the absolute value of the arc length is appropriate.

An object of the present invention is to increase the possibility that the arc length is continuously maintained constant when vertical-up welding is performed by generating an arc in a groove between steel plates to be welded and forming a molten pool.

SUMMARY OF THE INVENTION

In view of such an object, an aspect of the present invention provides an arc welding apparatus that performs vertical-up welding by generating an arc in a groove between steel plates to be welded and forming a molten pool. The arc welding apparatus includes welding means for performing arc welding by generating the arc from a welding wire in the groove between the steel plates to be welded in a substantially vertically downward direction and forming the molten pool, lifting means for lifting the welding means in a substantially vertically upward direction relative to the steel plates to be welded, a welding power source that feeds current to the welding wire to generate the arc, speed control means for monitoring output current output from the welding power source and, if a value of the output current is smaller than a value of current set in advance, controlling the lifting means such that rising speed of the welding means decreases or, if the value of the output current is larger than the set value of current, controlling the lifting means such that the rising speed of the welding means increases, and voltage control means for monitoring output voltage output from the welding power source during the welding, detecting information regarding the number of times that or periods for which a value of the output voltage falls below a determination voltage, which is set in advance as a determination threshold, and, if the information regarding the number of times or the periods exceeds the set threshold, controlling the welding power source such that the value of the output voltage increases or, if the information regarding the number of times or the periods is below the set threshold, controlling the welding power source such that the value of the output voltage decreases.

Here, the information regarding the number of times that or the periods for which the value of the output voltage falls below the determination voltage may be the number of times in unit time that the value of the output voltage falls below the determination voltage. The set threshold may be the number of times set in advance as the number of times in the unit time. When the determination voltage is 15 V, the set number of times may be any number of times within a range from 3 times per second to 60 times per second.

Alternatively, the information regarding the number of times that or the periods for which the value of the output voltage falls below the determination voltage may be a period obtained on the basis of a predetermined number of periods for which the value of the output voltage remains below the determination voltage. The set threshold may be time set in advance. In addition, when the determination voltage is 15 V, the set time may be any time within a range from 0.1 ms to 1.0 ms.

Furthermore, the speed control means may control the lifting means such that the rising speed of the welding means becomes lower than or equal to 180 mm/min.

In addition, another aspect of the present invention is an arc welding apparatus that performs vertical-up welding by generating an arc in a groove between steel plates to be welded and forming a molten pool. The arc welding apparatus includes a backing material mounted across a root gap provided in a back of the groove between the steel plates to be welded, welding means for performing arc welding by generating the arc from a welding wire in the groove between the steel plates to be welded in a substantially vertically downward direction and forming the molten pool, the welding means including a welding torch that is arranged in front of the groove between the steel plates to be welded and that supplies a welding wire into the groove, a weaving mechanism that oscillates the welding torch in a width direction of the groove, and a sliding copper plate that relatively slides over front surfaces of the steel plates to be welded in a substantially vertically upward direction, lifting means for lifting the welding means in the substantially vertically upward direction relative to the steel plates to be welded, a welding power source that feeds current to the welding wire to generate the arc, speed control means for monitoring output current output from the welding power source and, if a value of the output current is smaller than a value of current set in advance, controlling the lifting means such that rising speed of the welding means decreases or, if the value of the output current is larger than the set value of current, controlling the lifting means such that the rising speed of the welding means increases, and voltage control means for monitoring output voltage output from the welding power source during the welding, detecting information regarding the number of times that or periods for which a value of the output voltage falls below a determination voltage, which is set in advance as a determination threshold, and, if the information regarding the number of times or the periods exceeds the set threshold, controlling the welding power source such that the value of the output voltage increases or, if the information regarding the number of times or the periods is below the set threshold, controlling the welding power source such that the value of the output voltage decreases.

Furthermore, another aspect of the present invention is an arc welding apparatus that performs vertical-up welding by generating an arc in a groove between steel plates to be welded and forming a molten pool. The arc welding apparatus includes welding means for performing arc welding by generating arcs from a plurality of welding wires in the groove between the steel plates to be welded in a substantially vertically downward direction and forming the molten pool, lifting means for lifting the welding means in a substantially vertically upward direction relative to the steel plates to be welded, a plurality of welding power sources that feed current to the plurality of welding wires to generate the arcs, speed control means for monitoring output current output from one of the plurality of welding power sources and, if a value of the output current is smaller than a value of current set in advance, controlling the lifting means such that rising speed of the welding means decreases or, if the value of the output current is larger than the set value of current, controlling the lifting means such that the rising speed of the welding means increases, and a plurality of voltage control means for monitoring output voltages output from the plurality of welding power sources during the welding, detecting information regarding the number of times that or periods for which values of the output voltages fall below a determination voltage, which is set in advance as a determination threshold, and, if the information regarding the number of times or the periods exceeds the set threshold, controlling the welding power sources such that the values of the output voltages increase or, if the information regarding the number of times or the periods is below the set threshold, controlling the welding power sources such that the value of the output voltages decrease.

Furthermore, another aspect of the present invention is a constant voltage characteristic welding power source used for an arc welding apparatus that performs vertical-up welding by lifting, in a substantially vertically upward direction relative to steel plates to be welded, a welder that performs welding by generating an arc from a welding wire in a groove between the steel plates to be welded in a substantially vertically downward direction and forming a molten pool. The constant voltage characteristic welding power source includes power supply means for feeding current to the welding wire to generate the arc, speed control means for monitoring output current output from the power supply means and, if a value of the output current is smaller than a value of current set in advance, controlling the welder such that rising speed of the welder decreases or, if the value of the output current is larger than the set value of current, controlling the welder such that the rising speed of the welder increases, and voltage control means for monitoring output voltage output from the power supply means during the welding, detecting information regarding the number of times that or periods for which a value of the output voltage falls below a determination voltage, which is set in advance as a determination threshold, and, if the information regarding the number of times or the periods exceeds the set threshold, performing control such that the value of the output voltage increases or, if the information regarding the number of times or the periods is below the set threshold, performing control such that the value of the output voltage decreases.

On the other hand, another aspect of the present invention is a method for performing arc welding in which vertical-up welding is performed by lifting, in a substantially vertically upward direction relative to steel plates to be welded, a welder that performs welding by generating an arc from a welding wire in a groove between the steel plates to be welded in a substantially vertically downward direction and forming a molten pool. The method includes the steps of monitoring output current output from a welding power source that feeds current to the welding wire to generate the arc and, if a value of the output current is smaller than a value of current set in advance, controlling the welder such that rising speed of the welder decreases or, if the value of the output current is larger than the set value of current, controlling the welder such that the rising speed of the welder increases, and monitoring output voltage output from the welding power source during the welding, detecting information regarding the number of times that or periods for which a value of the output voltage falls below a determination voltage, which is set in advance as a determination threshold, and, if the information regarding the number of times or the periods exceeds the set threshold, performing control such that the value of the output voltage increases or, if the information regarding the number of times or the periods is below the set threshold, performing control such that the value of the output voltage decreases.

According to the present invention, it is possible to increase the possibility that the arc length is continuously maintained constant when vertical-up welding is performed by generating an arc in a groove between steel plates to be welded and forming a molten pool.

BRIEF DESCRIPTION OF THE DRAWINGS

FIG. 7 is a flowchart illustrating an example of the operation of a speed adjustment circuit according to the first embodiment;

FIG. 8 is a flowchart illustrating a first example of the operation of a voltage adjustment circuit according to the first embodiment;

FIG. 9 is a flowchart illustrating a second example of the operation of the voltage adjustment circuit according to the first embodiment;

DESCRIPTION OF THE PREFERRED EMBODIMENTS

Embodiments of the present invention will be described in detail hereinafter with reference to the accompanying drawings.

An object of the embodiments is to perform control such that an arc length (arc voltage) constantly remains at an appropriate value in any case. In order to achieve this object, first, the inventors have studied about appropriate welding conditions, and found out that, in vertical-up welding, short circuits occur at certain intervals under an arc length condition under which appropriate penetration may be secured and desirable properties of a weld metal may be obtained. A short circuit is a phenomenon in which an arc momentarily disappears and a leading end of a welding wire comes into contact with a surface of a molten pool.

When the number of short circuits in a certain period of time is large, failures in penetration occur because the arc length is large. On the other hand, when the number of short circuits is small, the properties of the weld metal deteriorate because the arc length is small.

The inventors have also found out that the arc length may be maintained at an appropriate value more accurately by measuring and controlling not the number of short circuits but periods (short circuit periods) for which short circuits are occurring.

By utilizing this phenomenon, a mechanism for sampling, analyzing, and determining voltage and issuing an output voltage instruction to a welding power source is invented for a welding apparatus.

With respect to actual control, because a short circuit is a phenomenon that lasts an extremely short period of time and accordingly it is technically difficult to observe a timing at which voltage becomes close to zero due to disappearance of an arc, an analysis is performed while regarding a time at which the voltage falls below a certain threshold as the beginning of a short circuit. In the embodiments, the threshold is defined as a determination voltage $V_{short}$, but the threshold may be an appropriate value at which control of the arc length becomes most stable in accordance with the lengths of secondary cables, welding conditions, a welding material, shielding gas, and the like. However, no problem arises insofar as the threshold is set between 10 V and 18 V, and the determination voltage $V_{short}$ is set to 15 V herein.

Figure 1:
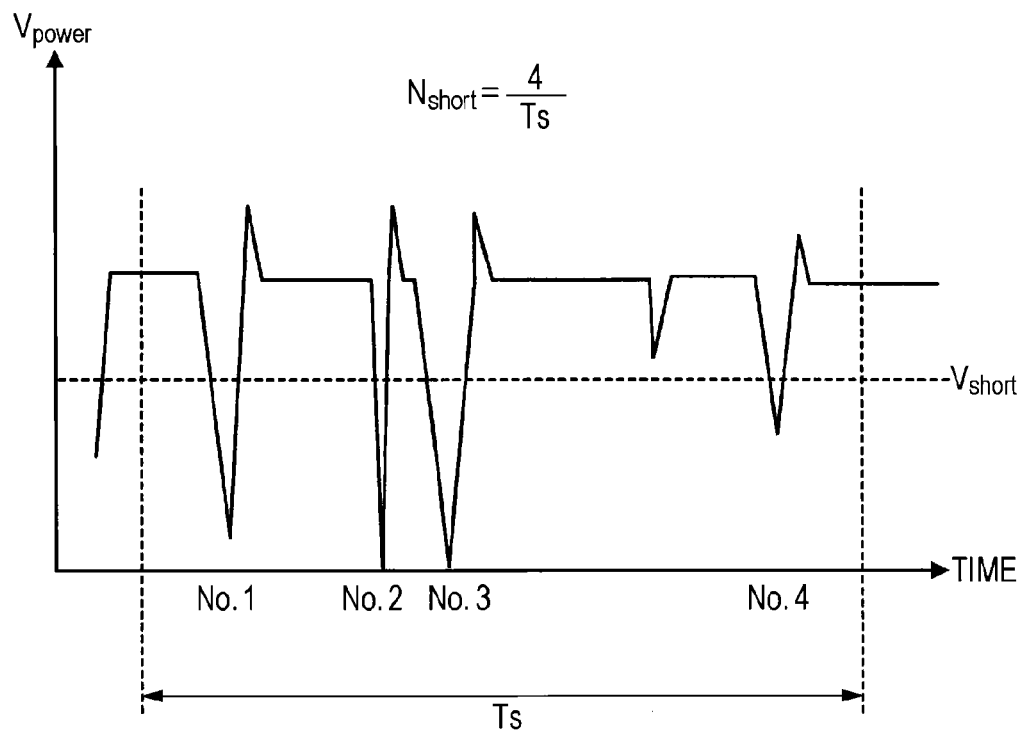
FIG. 1 is a diagram illustrating a case in which the number of short circuits is used as a parameter for controlling an arc length.

FIG. 1 is a diagram illustrating a case in which the number of short circuits is used as a parameter for controlling the arc length.

In this case, as illustrated in FIG. 1, changes in voltage, that is, voltage falling below the determination voltage $V_{short}$ and exceeding the determination voltage $V_{short}$ again, are counted as one short circuit, and the number of short circuits occurred in a certain period of time $T_s$ is divided by the certain period of time $T_s$ in order to obtain $N_{short}$ [times/s]. The certain period of time $T_s$ may be arbitrarily set in order to make the control most effective. The certain period of time $T_s$ is effective when the certain period of time $T_s$ is 0.1 to 1 second, but no problem arises when the certain period of time $T_s$ is about 0.5 second. However, when the determination voltage $T_s$ is too small, variation in $N_{short}$ becomes large, which can make the control unstable. On the other hand, when the determination voltage $T_s$ is too large, response speed in the control becomes low, which can also make the control unstable because it is difficult to instantly cope with a sharp change in the arc length.

If the determination voltage $T_s$ is 0.5 second in FIG. 1, $N_{short}$ is 8 times/s. The calculated $N_{short}$ is compared with a set number of times $N_{set}$, and a voltage output instruction according to a result is issued. This operation is sequentially performed as a routine in order to constantly maintain the arc length at an appropriate value.

Figure 2:
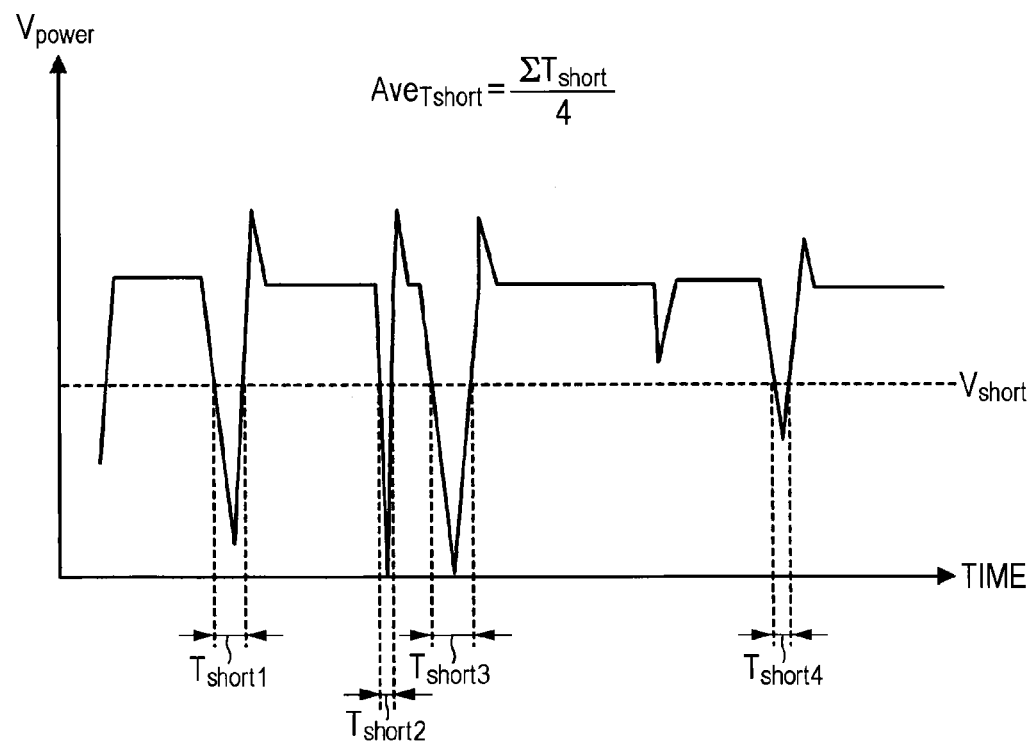
FIG. 2 is a diagram illustrating a case in which short circuit periods are used as the parameter for controlling the arc length.

FIG. 2 is a diagram illustrating a case in which short circuit periods are used as the parameter for controlling the arc length.

In this case, as illustrated in FIG. 2, times taken for the voltage to exceed the determination voltage $V_{short}$ again after falling below the determination voltage $V_{short}$ are measured as $T_{short1}$, $T_{short2}$, and so on, and an average of a certain number of times is calculated as an average short circuit period $Ave_{Tshort}$ and used for a comparison. More specifically, the average short circuit period $Ave_{Tshort}$ is obtained by dividing a sum $\Sigma T_{short}$ of the times $T_{short1}$, $T_{short2}$, and so on by the number of short circuits. The number of short circuits used to calculate the average value may be arbitrarily determined in order to make the control most effective. The number of short circuits is effective when the number of short circuits is 3 to 20, but no problem arises when the number of short circuits is about 5. However, when the number of short circuits used to calculate the average value is too small, variation in the average short circuit period $Ave_{Tshort}$ becomes large, which can make the control unstable. On the other hand, when the number of short circuits used to calculate the average value is too large, the response speed in the control becomes low, which can also make the control unstable because it is difficult to instantly cope with a sharp change in the arc length.

In FIG. 2, the calculated average short circuit period $Ave_{Tshort}$ is compared with a set time $T_{set}$, and a voltage output instruction according to a result is issued. This operation is sequentially performed as a routine in order to constantly maintain the arc length at an appropriate value.

Next, a method for realizing such control will be described in detail. Because electrogas arc welding may be typically of a one-electrode type or a two-electrode type, the former will be described as a first embodiment and the latter will be described as a second embodiment.

First, a method for realizing control according to the first embodiment will be described.

Figure 3:
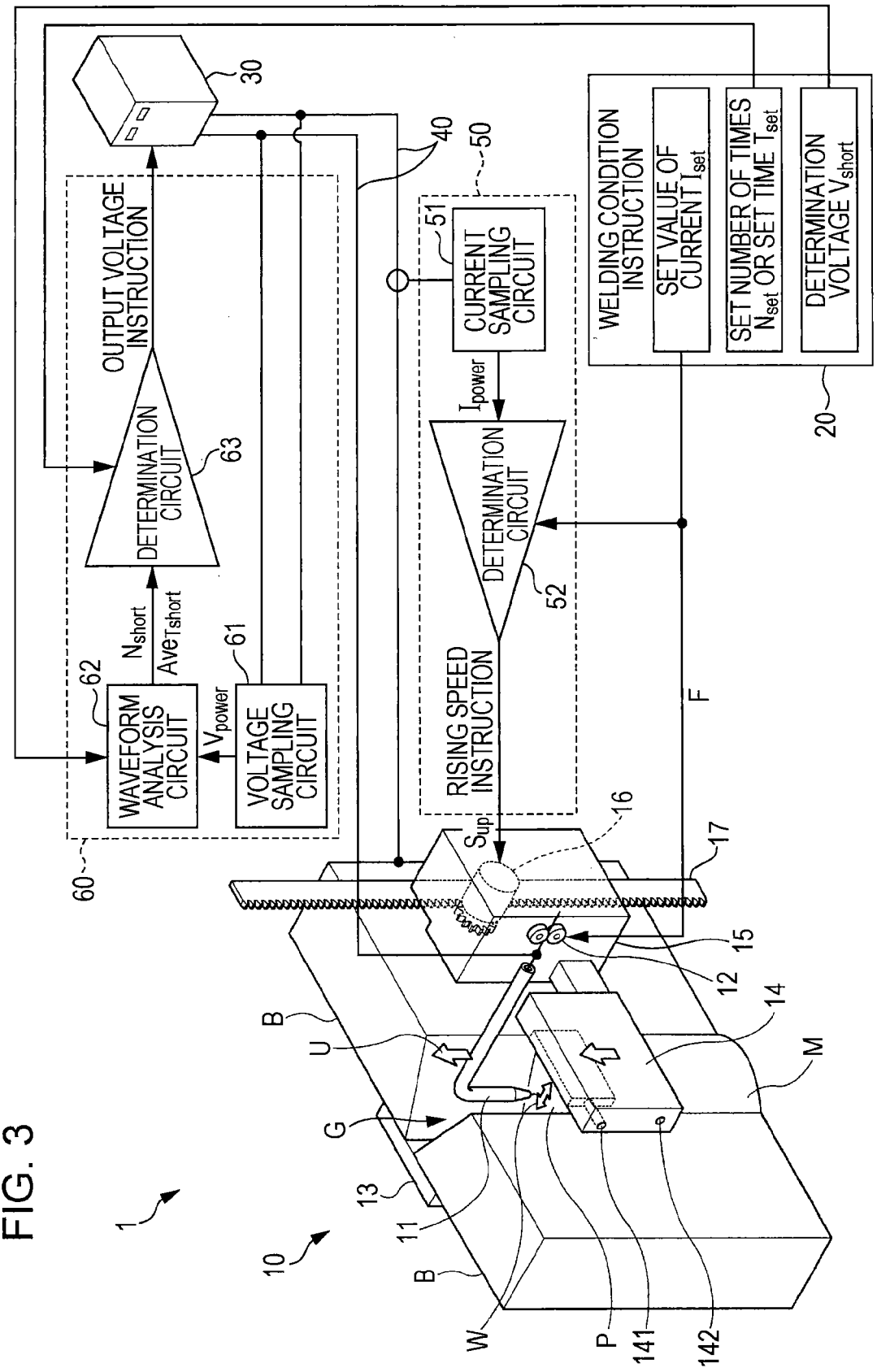
FIG. 3 is a schematic diagram illustrating the configuration of a welding apparatus according to a first embodiment.

FIG. 3 is a schematic diagram illustrating the configuration of a welding apparatus 1 according to the first embodiment.

As illustrated in FIG. 3, the welding apparatus 1 according to the first embodiment includes a welding robot 10 for performing electrogas arc welding in which welding is performed by generating an arc from an electrode and an operation display box 20 for operating the welding robot 10 and displaying information regarding the welding robot 10. In addition, the welding apparatus 1 includes a welding power source 30 that supplies power for the welding and secondary cables 40 through which a current output from the welding power source 30 flows. Furthermore, the welding apparatus 1 includes a speed adjustment circuit 50 that adjusts the rising speed of a welder of the welding robot 10 on the basis of the current flowing through the secondary cables 40 and a voltage adjustment circuit 60 that adjusts output voltage of the welding power source 30 on the basis of the voltage output from the welding power source 30.

The welding robot 10 includes a welding torch 11 for forming a molten pool P in a groove G extending in a vertical direction of a base metal B, which is configured by a pair of steel plates, or a direction close to the vertical direction, a wire feed motor 12 that feeds a welding wire that functions as the electrode to the welding torch 11, a backing material 13 mounted on a back of the groove G, and a sliding copper plate 14 mounted on a front of the groove G. The welding robot 10 also includes a carriage 15 that is linked to the welder, which includes the welding torch 11, the wire feed motor 12, and the sliding copper plate 14, and that rises in accordance with the rise of the surface of the molten pool P, a lifting motor 16 that lifts the carriage 15 at a specified speed, and a rail 17 that guides the rise of the carriage 15.

The welding torch 11 includes the welding wire, which generates an arc when voltage is applied from the welding power source 30. The welding torch 11 may perform weaving in a direction indicated by an arrow W using a weaving motor, which is not illustrated.

The wire feed motor 12 feeds the welding wire to the welding torch 11 from a wire reel, which is not illustrated and on which the welding wire is wound, in order to feed the welding wire to the groove G. At this time, a rate F at which the wire feed motor 12 feeds the welding wire is determined by converting a set value of current $I_{set}$, which will be described later.

The backing material 13 is a member mounted across a root gap in the back of the groove G, and may be composed of a metal or a nonmetal. Alternatively, the backing material 13 is not provided when the base metal B does not include a root gap.

The sliding copper plate 14 is a copper plate capable of sliding in a longitudinal direction of the groove G relative to the groove G. A gas supply port 141 is provided in the sliding copper plate 14, and shielding gas supplied from the gas supply port 141 covers the arc in order to prevent air from entering a welding atmosphere. A cooling tube 142 is also provided in the sliding copper plate 14, and water flowing through the cooling tube 142 cools the molten pool P through the sliding copper plate 14 in order to make the molten pool P become a weld metal M.

The carriage 15 is guided by the rail 17 and rises in the longitudinal direction of the groove G. As a result, the welding torch 11, the wire feed motor 12, and the sliding copper plate 14 also rise in the longitudinal direction (a direction indicated by a hollow arrow U in FIG. 3) of the groove G.

The lifting motor 16 lifts the carriage 15 at a speed based on an instruction from the speed adjustment circuit 50.

The rail 17 is a steel member extending on the base metal B in the longitudinal direction of the groove G.

The operation display box 20 is an apparatus used to, for example, specify the welding conditions before the welding robot 10 begins to operate. Here, the welding conditions include the set value of current $I_{set}$ and the determination voltage $V_{short}$. The welding conditions also include the set number of times $N_{set}$, which is a threshold for the number of short circuits in the certain period of time, and the set time $T_{set}$, which is a threshold for the average short circuit period. Although not illustrated, the operation display box 20 includes a display screen configured by a liquid crystal display or the like and input buttons. Alternatively, the operation display box 20 may be a known touch panel adopting, for example, a capacitive method in which a position touched by a finger is electrically detected by detecting a change in the surface charge of the panel on which a low-voltage electric field has been formed or a resistive method in which a position touched by a finger is electrically detected by detecting a change from a nonconductive state to a conductive state at a position of electrodes that are separated from each other.

The welding power source 30 is a constant voltage characteristic welding power source, and, when the rate F at which the wire feed motor 12 feeds the welding wire has been determined, outputs a current large enough to melt the welding wire.

Each of the secondary cables 40 are cables connecting the welding power source 30 and the welding wire included in the welding torch 11 or the base metal B. The secondary cables 40 connect a positive terminal of the welding power source 30 to the welding wire and a negative terminal of the welding power source 30 to the base metal B.

The speed adjustment circuit 50 includes a current sampling circuit 51 that samples the current flowing through the secondary cables 40 and a determination circuit 52 that determines the current sampled by the current sampling circuit 51 and that issues a lifting speed instruction to the lifting motor 16.

The current sampling circuit 51 monitors a current $I_{power}$ output from the welding power source 30 and flowing through the secondary cables 40.

When the current $I_{power}$ is smaller than the set value of current $I_{set}$, the determination circuit 52 issues an instruction to decrease a rising speed $S_{up}$ of the carriage 15, and when the current $I_{power}$ is equal to the set value of current $I_{set}$, the determination circuit 52 issues an instruction to maintain the rising speed $S_{up}$ of the carriage 15. When the current $I_{power}$ is larger than the set value of current $I_{set}$, the determination circuit 52 issues an instruction to increase the rising speed $S_{up}$.

The voltage adjustment circuit 60 includes a voltage sampling circuit 61 that samples the voltage output from the welding power source 30, a waveform analysis circuit 62 that analyzes the waveform of the voltage sampled by the voltage sampling circuit 61 and that outputs a result of the analysis, and a determination circuit 63 that issues an output voltage instruction to the welding power source 30 in accordance with the result of the analysis obtained by the waveform analysis circuit 62.

The voltage sampling circuit 61 monitors voltage $V_{power}$ output from the welding power source 30 during welding.

The waveform analysis circuit 62 counts the number of times $N_{short}$ [times/s] in unit time that the voltage $V_{power}$ falls below the certain determination voltage $V_{short}$. Alternatively, the waveform analysis circuit 62 calculates the average short circuit period $Ave_{Tshort}$ Ed of a certain number of periods for which the voltage $V_{power}$ remains below the certain determination voltage $V_{short}$.

When the number of times $N_{short}$ is larger than the set number of times $N_{set}$, the determination circuit 63 issues an instruction to increase the voltage $V_{power}$, and when the number of times $N_{short}$ is equal to the set number of times $N_{set}$, the determination circuit 63 issues an instruction to maintain the voltage $V_{power}$. When the number of times $N_{short}$ is smaller than the set number of times $N_{set}$, the determination circuit 63 issues an instruction to decrease the voltage $V_{power}$. Alternatively, when the average short circuit period $Ave_{Tshort}$ of the certain number of periods is longer than the set time $T_{set}$, the determination circuit 63 issues an instruction to increase the voltage $V_{power}$, and when the average short circuit period $Ave_{Tshort}$ is equal to the set time $T_{set}$, the determination circuit 63 issues an instruction to maintain the voltage $V_{power}$. When the average short circuit period $Ave_{Tshort}$ is shorter than the set time $T_{set}$, the determination circuit 63 issues an instruction decrease the voltage $V_{power}$.

Figure 4:
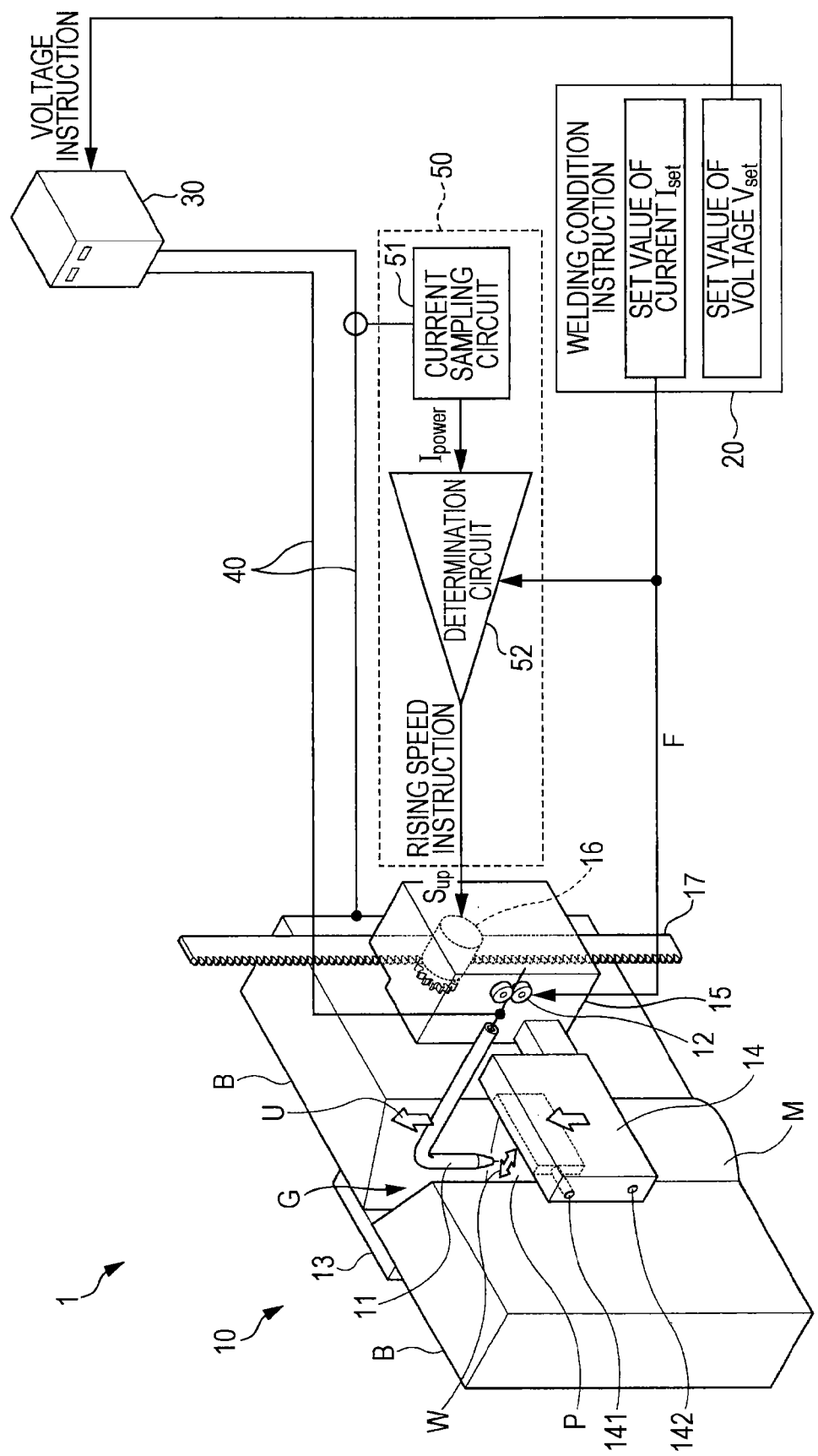
FIG. 4 is a schematic diagram illustrating the configuration of a welding apparatus in the related art as a comparative example of the welding apparatus according to the first embodiment.

FIG. 4 is a schematic diagram illustrating the configuration of a welding apparatus 1 in the related art as a comparative example of the welding apparatus 1 according to the first embodiment.

The welding apparatus 1 in the related art does not include the voltage adjustment circuit 60, which is included in the welding apparatus 1 according to the first embodiment illustrated in FIG. 3, and the welding conditions thereof specified by the operation display box 20 only include a set value of voltage $V_{set}$ and do not include the determination voltage $V_{short}$, the set number of times $N_{set}$, and the set time $T_{set}$. Therefore, detailed description of each component is omitted.

Although the voltage adjustment circuit 60 is configured as a so-called control box independent of the welding power source 30 in the first embodiment, the present invention is not limited to this. When the voltage adjustment circuit 60 is included in the welding power source 30 and the welding power source 30 is used as a dedicated power source, portability and connectability improve, which makes the welding power source 30 more convenient.

Although not illustrated in FIG. 3, a voltage adjustment function (realized by a dial or digital setting) that adjusts the output voltage to the set value of voltage $V_{set}$ and that is invariably used by a general welding power source 30 is valid only during arc startup herein regardless of whether the voltage adjustment circuit 60 is a control box or included in the welding power source 30. This is because the voltage adjustment function is generally a function of enabling an operator to consciously adjust the arc length, but since the arc length is automatically adjusted to an optimal value in the present embodiment, an adjustment operation performed by the operator using his/her own physical functions and determinations is not necessary whereas, only during the arc startup, the control according to the present embodiment does not function due to its calculation mechanism. That is, the voltage adjustment function according to the present embodiment exists to determine arc startup voltage. However, because the voltage adjustment function hardly affects the welding quality, the importance of the voltage adjustment function is significantly lower than that in the welding apparatus 1 in the related art.

Next, a method for realizing control according to the second embodiment will be described.

Figure 5:
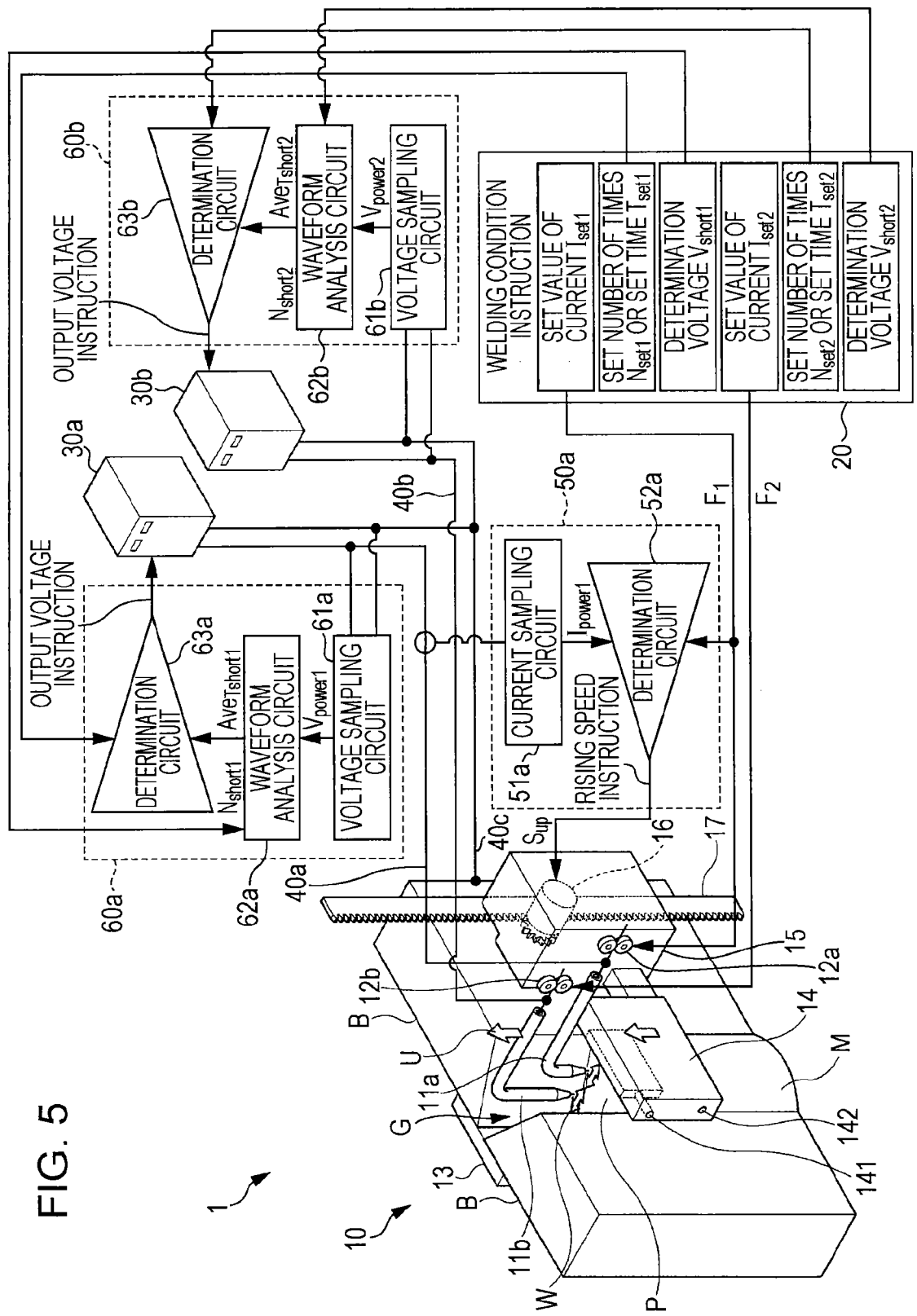
FIG. 5 is a schematic diagram illustrating the configuration of a welding apparatus according to a second embodiment.

FIG. 5 is a schematic diagram illustrating the configuration of a welding apparatus 1 according to the second embodiment.

As illustrated in FIG. 5, the welding apparatus 1 according to the second embodiment includes a welding robot 10 for performing electrogas arc welding in which welding is performed by generating arcs from electrodes and an operation display box 20 for operating the welding robot 10 and displaying information regarding the welding robot 10. In addition, the welding apparatus 1 includes welding power sources 30a and 30b that supply power for the welding, a secondary cable 40a through which a current output from the welding power source 30a flows, a secondary cable 40b through which a current output from the welding power source 30b flows, and a secondary cable 40c through which the currents output from the welding power sources 30a and 30b flow. Furthermore, the welding apparatus 1 includes a speed adjustment circuit 50a that adjusts the rising speed of a welder of the welding robot 10 on the basis of the current flowing through the secondary cable 40a, a voltage adjustment circuit 60a that adjusts output voltage of the welding power source 30a on the basis of the voltage output from the welding power source 30a, and a voltage adjustment circuit 60b that adjusts output voltage of the welding power source 30b on the basis of the voltage output from the welding power source 30b.

The welding robot 10 includes welding torches 11a and 11b for forming a molten pool P in a groove G extending in a vertical direction of a base metal B, which is configured by a pair of steel plates, or a direction close to the vertical direction, wire feed motors 12a and 12b that feed welding wires that function as the electrodes to the welding torches 11a and 11b, respectively, a backing material 13 mounted on a back of the groove G, and a sliding copper plate 14 mounted on a front of the groove G. The welding robot 10 also includes a carriage 15 that is linked to the welder, which includes the welding torches 11a and 11b, the wire feed motors 12a and 12b, and the sliding copper plate 14, and that rises in accordance with the rise of the surface of the molten pool P, a lifting motor 16 that lifts the carriage 15 at a specified speed, and a rail 17 that guides the rise of the carriage 15.

The welding torches 11a and 11b include the welding wires, respectively, which generate arcs when voltage is applied from the welding power sources 30a and 30b, respectively. The welding torches 11a and 11b may perform weaving in directions indicated by arrows W using weaving motors, which are not illustrated.

The wire feed motors 12a and 12b feed the welding wires to the welding torches 11a and 11b, respectively, from wire reels, which are not illustrated and on which the welding wires are wound, in order to feed the welding wires to the groove G. At this time, a rate $F_1$ at which the wire feed motor 12a feeds the welding wire is determined by converting a set value of current $I_{set1}$, which will be described later, and a rate $F_2$ at which the wire feed motor 12b feeds the welding wire is determined by converting a set value of current $I_{set2}$, which will be described later.

The backing material 13, the sliding copper plate 14, the carriage 15, the lifting motor 16, and the rail 17 are the same as those described with reference to the first embodiment, and accordingly description thereof is omitted.

The operation display box 20 is an apparatus used to, for example, specify the welding conditions before the welding robot 10 begins to operate. Here, the welding conditions include the set value of current $I_{set1}$, a determination voltage $V_{short1}$, the set value of current $I_{set2}$, and a determination voltage $V_{short2}$. The welding conditions also include a set number of times $N_{set1}$, which is a threshold for the number of short circuits in a certain period of time, and a set time $T_{set1}$, which is a threshold for the average short circuit period. Furthermore, the welding conditions include a set number of times $N_{set2}$, which is a threshold for the number of short circuits in the certain period of time, and a set time $T_{set2}$, which is a threshold for the average short circuit period. Although not illustrated, the operation display box 20 includes a display screen configured by a liquid crystal display or the like and input buttons. Alternatively, the operation display box 20 may be a known touch panel adopting, for example, a capacitive method in which a position touched by a finger is electrically detected by detecting a change in the surface charge of the panel on which a low-voltage electric field has been formed or a resistive method in which a position touched by a finger is electrically detected by detecting a change from a nonconductive state to a conductive state at a position of electrodes that are separated from each other.

The welding power source 30*a* is a constant voltage characteristic welding power source, and, when the rate $F_1$ at which the wire feed motor 12*a* feeds the welding wire has been determined, outputs a current large enough to melt the welding wire. When the rate $F_2$ at which the wire feed motor 12*b* feeds the welding wire has been determined, the welding power source 30*b* outputs a current large enough to melt the welding wire.

The secondary cable 40*a* is a cable connecting the welding power source 30*a* and the welding wire included in the welding torch 11*a*, the secondary cable 40*b* is a cable connecting the welding power source 30*b* and the welding wire included in the welding torch 11*b*, and the secondary cable 40*c* is a cable connecting the welding power sources 30*a* and 30*b* and the base metal B. The secondary cables 40*a* and 40*b* connect positive terminals of the welding power sources 30*a* and 30*b*, respectively, to the welding wires, and the secondary power source 40*c* connects negative terminals of the welding power sources 30*a* and 30*b* to the base metal B.

The speed adjustment circuit 50*a* includes a current sampling circuit 51*a* that samples the current flowing through the secondary cable 40*a* and a determination circuit 52*a* that determines the current sampled by the current sampling circuit 51*a* and that issues a lifting speed instruction to the lifting motor 16.

The current sampling circuit 51*a* monitors a current $I_{power1}$ output from the welding power source 30*a* and flowing through the secondary cable 40*a*.

When the current $I_{power1}$ is smaller than the set value of current $I_{set1}$, the determination circuit 52*a* issues an instruction to decrease a rising speed $S_{up}$ of the carriage 15, and when the current $I_{power1}$ is equal to the set value of current $I_{set1}$, the determination circuit 52*a* issues an instruction to maintain the rising speed $S_{up}$ of the carriage 15. When the current $I_{power1}$ is larger than the set value of current $I_{set1}$, the determination circuit 52*a* issues an instruction to increase the rising speed $S_{up}$.

The voltage adjustment circuit 60*a* includes a voltage sampling circuit 61*a* that samples the voltage output from the welding power source 30*a*, a waveform analysis circuit 62*a* that analyzes the waveform of the voltage sampled by the voltage sampling circuit 61*a* and that outputs a result of the analysis, and a determination circuit 63*a* that issues an output voltage instruction to the welding power source 30*a* in accordance with the result of the analysis obtained by the waveform analysis circuit 62*a*.

The voltage sampling circuit 61*a* monitors voltage $V_{power1}$ output from the welding power source 30*a* during the welding.

The waveform analysis circuit 62*a* counts a number of times $N_{short1}$ [times/s] in unit time that the voltage $V_{power1}$ falls below the certain determination voltage $V_{short1}$. Alternatively, the waveform analysis circuit 62*a* calculates an average short circuit period $Ave_{Tshort1}$ [s] of a certain number of periods for which the voltage $V_{power1}$ remains below the certain determination voltage $V_{short1}$.

When the number of times $N_{short1}$ is larger than the set number of times $N_{set1}$, the determination circuit 63*a* issues an instruction to increase the voltage $V_{power1}$, and when the number of times $N_{short1}$ is equal to the set number of times $N_{set1}$, the determination circuit 63*a* issues an instruction to maintain the voltage $V_{power1}$. When the number of times $N_{short1}$ is smaller than the set number of times $N_{set1}$, the determination circuit 63*a* issues an instruction to decrease the voltage $V_{power1}$. Alternatively, when the average short circuit period $Ave_{Tshort1}$ of the certain number of periods is longer than the set time $T_{set1}$, the determination circuit 63*a* issues an instruction to increase the voltage $V_{power1}$, and when the average short circuit period $AVe_{Tshort1}$ is equal to the set time $T_{set1}$, the determination circuit 63*a* issues an instruction to maintain the voltage $V_{power1}$. When the average short circuit period $Ave_{Tshort1}$ is shorter than the set time $T_{set1}$, the determination circuit 63*a* issues an instruction to decrease the voltage $V_{power1}$.

The voltage adjustment circuit 60*b* includes a voltage sampling circuit 61*b* that samples the voltage output from the welding power source 30*b*, a waveform analysis circuit 62*b* that analyzes the waveform of the voltage sampled by the voltage sampling circuit 61*b* and that outputs a result of the analysis, and a determination circuit 63*b* that issues an output voltage instruction to the welding power source 30*b* in accordance with the result of the analysis obtained by the waveform analysis circuit 62*b*.

The voltage sampling circuit 61*b* monitors voltage $V_{power2}$ output from the welding power source 30*b* during welding.

The waveform analysis circuit 62*b* counts a number of times $N_{short2}$ [times/s] in unit time that the voltage $V_{power2}$ falls below the certain determination voltage $V_{short2}$. Alternatively, the waveform analysis circuit 62*b* calculates the average short circuit period $Ave_{Tshort2}$ [s] of a certain number of periods for which the voltage $V_{power2}$ remains below the certain determination voltage $V_{short2}$.

When the number of times $N_{short2}$ is larger than the set number of times $N_{set2}$, the determination circuit 63*b* issues an instruction to increase the voltage $V_{power2}$, and when the number of times $N_{short2}$ is equal to the set number of times $N_{set2}$, the determination circuit 63*b* issues an instruction to maintain the voltage $V_{power2}$. When the number of times $N_{short2}$ is smaller than the set number of times $N_{set2}$, the determination circuit 63*b* issues an instruction to decrease the voltage $V_{power2}$. Alternatively, when the average short circuit period $Ave_{Tshort2}$ of the certain number of periods is longer than the set time $T_{set2}$, the determination circuit 63*b* issues an instruction to increase the voltage $V_{power2}$, and when the average short circuit period $Ave_{Tshort2}$ is equal to the set time $T_{set2}$, the determination circuit 63*b* issues an instruction to maintain the voltage $V_{power2}$. When the average short circuit period $Ave_{Tshort2}$ is shorter than the set time $T_{set2}$, the determination circuit 63*b* issues an instruction to decrease the voltage $V_{power2}$.

Figure 6:
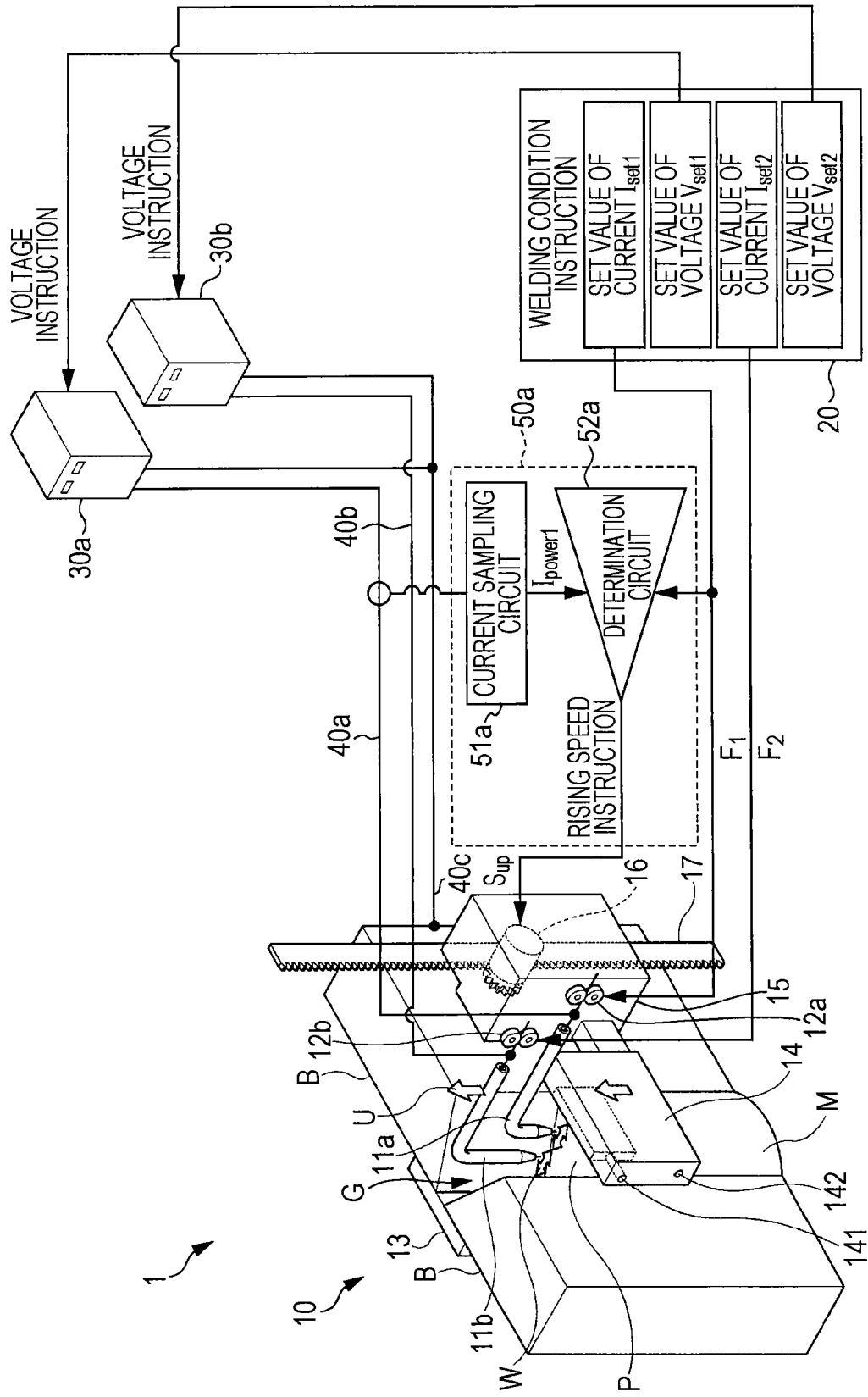
FIG. 6 is a schematic diagram illustrating the configuration of a welding apparatus in the related art as a comparative example of the welding apparatus according to the second embodiment.

FIG. 6 is a schematic diagram of the configuration of a welding apparatus 1 in the related art as a comparative example of the welding apparatus 1 according to the second embodiment.

The welding apparatus 1 in the related art does not include the voltage adjustment circuits 60a and 60b, which are included in the welding apparatus 1 according to the second embodiment illustrated in FIG. 5, and the welding conditions thereof specified by the operation display box 20 only include set values of voltage $V_{set1}$ and $V_{set2}$ and do not include the determination voltages $V_{short1}$ and $V_{short2}$, the set numbers of times $N_{set1}$ and $N_{set2}$, and the set times $T_{set1}$ and $T_{set2}$. Therefore, detailed description of each component is omitted.

Although the voltage adjustment circuit 60a is configured as a so-called control box independent of the welding power source 30a and the voltage adjustment circuit 60b is configured as a so-called control box independent of the welding power source 30b in the second embodiment, the present invention is not limited to this. When the voltage adjustment circuit 60a is included in the welding power source 30a and the voltage adjustment circuit 60b is included in the welding power source 30b and then the welding power sources 30a and 30b are used as dedicated power sources, portability and connectability improve, which makes the welding power sources 30a and 30b more convenient.

Although not illustrated in FIG. 5, a voltage adjustment function (realized by a dial or digital setting) that adjusts the output voltages to the set values of voltage $V_{set1}$ and $V_{set2}$ and that is invariably used by general welding power sources 30a and 30b is valid only during arc startup herein regardless of whether the voltage adjustment circuits 60a and 60b are control boxes or included in the welding power sources 30a and 30b, respectively. This is because the voltage adjustment function is generally a function of enabling an operator to consciously adjust the arc length, but since the arc length is automatically adjusted to an optimal value in the present embodiment, an adjustment operation performed by the operator using his/her own physical functions and determinations is not necessary whereas, only during the arc startup, the control according to the present embodiment does not function due to its calculation mechanism. That is, the voltage adjustment function according to the present embodiment exists to determine arc startup voltage. However, because the voltage adjustment function hardly affects the welding quality, the importance of the voltage adjustment function is significantly lower than that in the welding apparatus 1 in the related art.

FIG. 7 is a flowchart illustrating an example of the operation of the speed adjustment circuit 50 illustrated in FIG. 3.

As illustrated in FIG. 7, first, the current sampling circuit 51 of the speed adjustment circuit 50 samples the current $I_{power}$ flowing through the secondary cables 40 (step 501).

Next, the determination circuit 52 compares the current $I_{power}$ with the set value of current $I_{set}$ (step 502). As a result, if the current $I_{power}$ is smaller than the set value of current $I_{set}$, the determination circuit 52 issues an instruction to decrease the rising speed $S_{up}$ of the carriage 15 to the lifting motor 16 (step 503). On the other hand, if the current $I_{power}$ is larger than the set value of current $I_{set}$, the determination circuit 52 issues an instruction to increase the rising speed $S_{up}$ of the carriage 15 to the lifting motor 16 (step 504). If the current $I_{power}$ is equal to the set value of current $I_{set}$, the determination circuit 52 issues an instruction to maintain the rising speed $S_{up}$ of the carriage 15 to the lifting motor 16 (step 505).

An example of the operation of the speed adjustment circuit 50a illustrated in FIG. 5 is the same as the above-described example. In this case, however, the speed adjustment circuit 50, the current sampling circuit 51, the determination circuit 52, the secondary cables 40, the current $I_{power}$, and the set value of current Let in the flowchart of FIG. 7 and the above description need to be replaced by the speed adjustment circuit 50a, the current sampling circuit 51a, the determination circuit 52a, the secondary cable 40a, the current $I_{power1}$, and the set value of current $I_{set1}$, respectively.

FIG. 8 is a flowchart illustrating a first example of the operation of the voltage adjustment circuit 60 illustrated in FIG. 3. In the first example of the operation, as illustrated in FIG. 1, the number of short circuits is used as the parameter for controlling the arc length.

As illustrated in FIG. 8, first, the voltage sampling circuit 61 of the voltage adjustment circuit 60 samples the voltage $V_{power}$ output from the welding power source 30 (step 601).

Next, the waveform analysis circuit 62 analyzes the waveform of the voltage $V_{power}$, and calculates the number of times $N_{short}$ [times/s] in unit time that the voltage $V_{power}$ falls below the determination voltage $V_{short}$ (step 602).

Next, the determination circuit 63 compares the number of times $N_{short}$ with the set number of times $N_{set}$ (step 603). As a result, if the number of times $N_{short}$ is larger than the set number of times $N_{set}$, the determination circuit 63 issues an instruction to increase the voltage $V_{power}$ to the welding power source 30 (step 604). On the other hand, if the number of times $N_{short}$ is smaller than the set number of times $N_{set}$, the determination circuit 63 issues an instruction to decrease the voltage $V_{power}$ to the welding power source 30 (step 605). If the number of times $N_{short}$ is equal to the set number of times $N_{set}$, the determination circuit 63 issues an instruction to maintain the voltage $V_{power}$ to the welding power source 30 (step 606).

An example of the operation of the voltage adjustment circuit 60a illustrated in FIG. 5 is the same as the above-described example when the number of short circuits is used as the parameter for controlling the arc length. In this case, however, the voltage adjustment circuit 60, the voltage sampling circuit 61, the waveform analysis circuit 62, the determination circuit 63, the welding power source 30, the voltage $V_{power}$, the determination voltage $V_{short}$, the number of times $N_{short}$, and the set number of times $N_{set}$ in the flowchart of FIG. 8 and the above description need to be replaced by the voltage adjustment circuit 60a, the voltage sampling circuit 61a, the waveform analysis circuit 62a, the determination circuit 63a, the welding power source 30a, the voltage $V_{power1}$, the determination voltage $V_{short}$, the number of times $N_{short}$, and the set number of times $N_{set1}$, respectively.

An example of the operation of the voltage adjustment circuit 60b illustrated in FIG. 5 is also the same as the above-described example when the number of short circuits is used as the parameter for controlling the arc length. In this case, however, the voltage adjustment circuit 60, the voltage sampling circuit 61, the waveform analysis circuit 62, the determination circuit 63, the welding power source 30, the voltage $V_{power}$, the determination voltage $V_{short}$, the number of times $N_{short}$, and the set number of times $N_{set}$ in the flowchart of FIG. 8 and the above description need to be replaced by the voltage adjustment circuit 60b, the voltage sampling circuit 61b, the waveform analysis circuit 62b, the determination circuit 63b, the welding power source 30b, the voltage $V_{power2}$, the determination voltage $V_{short2}$, the number of times $N_{short2}$, and the set number of times $N_{set2}$, respectively.

FIG. 9 is a flowchart illustrating a second example of the operation of the voltage adjustment circuit 60 illustrated in FIG. 3. In the second example of the operation, as illustrated in FIG. 2, the short circuit periods are used as the parameter for controlling the arc length.

As illustrated in FIG. 9, first, the voltage sampling circuit 61 of the voltage adjustment circuit 60 samples the voltage $V_{power}$ output from the welding power source 30 (step 651).

Next, the waveform analysis circuit 62 analyzes the waveform of the voltage $V_{power}$, and calculates the average short circuit period $Ave_{Tshort}$[s] of the certain number of periods for which the voltage $V_{power}$ remains below the determination voltage $V_{short}$ (step 652).

Next, the determination circuit 63 compares the average short circuit period $Ave_{Tshort}$ with the set time $T_{set}$ (step 653). As a result, if the average short circuit period $Ave_{Tshort}$ is longer than the set time $T_{set}$, the determination circuit 63 issues an instruction to increase the voltage $V_{power}$ to the welding power source 30 (step 654). On the other hand, if the average short circuit period $Ave_{Tshort}$ is shorter than the set time $T_{set}$, the determination circuit 63 issues an instruction to decrease the voltage $V_{power}$ to the welding power source 30 (step 655). If the average short circuit period $Ave_{Tshort}$ is equal to the set time $T_{set}$, the determination circuit 63 issues an instruction to maintain the voltage $V_{power}$ to the welding power source 30 (step 656).

An example of the operation of the voltage adjustment circuit 60a illustrated in FIG. 5 is the same as the above-described example when the short circuit periods are used as the parameter for controlling the arc length. In this case, however, the voltage adjustment circuit 60, the voltage sampling circuit 61, the waveform analysis circuit 62, the determination circuit 63, the welding power source 30, the voltage $V_{power}$, the determination voltage $V_{short}$, the average short circuit period $Ave_{Tshort}$, and the set time $T_{set}$ in the flowchart of FIG. 9 and the above description need to be replaced by the voltage adjustment circuit 60a, the voltage sampling circuit 61a, the waveform analysis circuit 62a, the determination circuit 63a, the welding power source 30a, the voltage $V_{power1}$, the determination voltage $V_{short1}$, the average short circuit period $Ave_{Tshort1}$, and the set time $T_{set1}$, respectively.

An example of the operation of the voltage adjustment circuit 60b illustrated in FIG. 5 is also the same as the above-described example when the short circuit periods are used as the parameter for controlling the arc length. In this case, however, the voltage adjustment circuit 60, the voltage sampling circuit 61, the waveform analysis circuit 62, the determination circuit 63, the welding power source 30, the voltage $V_{power}$, the determination voltage $V_{short}$, the average short circuit period $Ave_{Tshort}$, and the set time $T_{set}$ in the flowchart of FIG. 9 and the above description need to be replaced by the voltage adjustment circuit 60b, the voltage sampling circuit 61b, the waveform analysis circuit 62b, the determination circuit 63b, the welding power source 30b, the voltage $V_{power2}$, the determination voltage $V_{short2}$, the average short circuit period $Ave_{Tshort2}$, and the set time $T_{set2}$, respectively.

Although the present embodiments are examples in which the present invention is applied to butt joint welding of plates in a vertical attitude, the present invention may be applied to any type of vertical-up welding.

FIGS. 10A to 10F illustrate examples of welding to which the present invention may be applied.

Figure 10C:
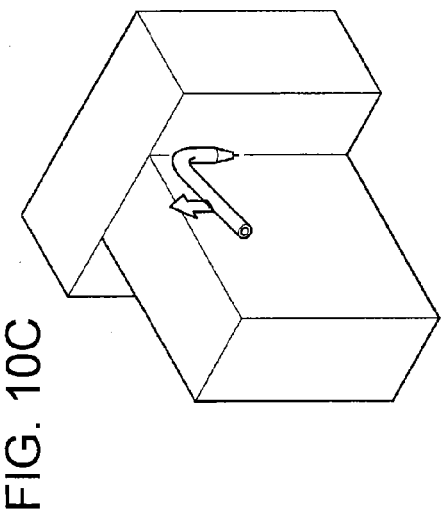
FIGS. 10A to 10D are diagrams illustrating examples of welding to which the present invention may be applied.
Figure 10D:
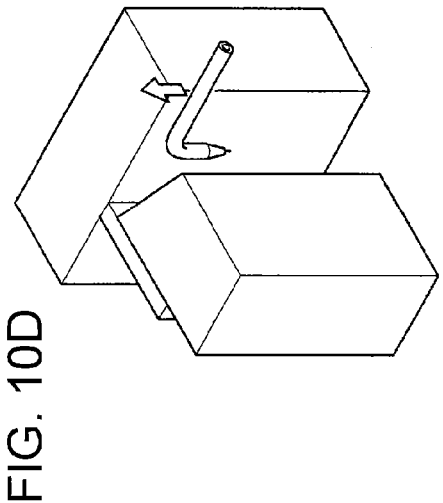
Figure 10A:
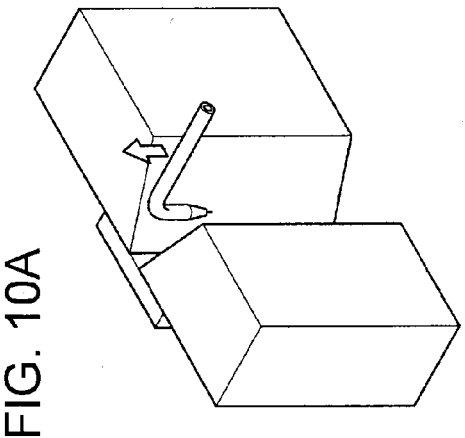
Figure 10B:
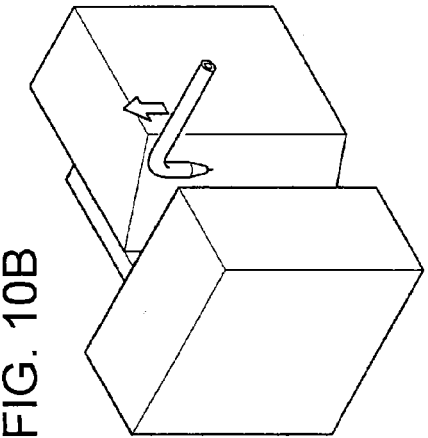
Figure 10E:
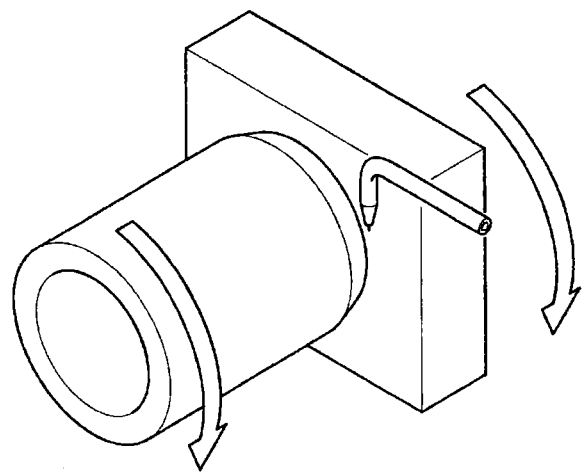
FIGS. 10E and 10F are diagrams illustrating examples of the welding to which the present invention may be applied.
Figure 10F:
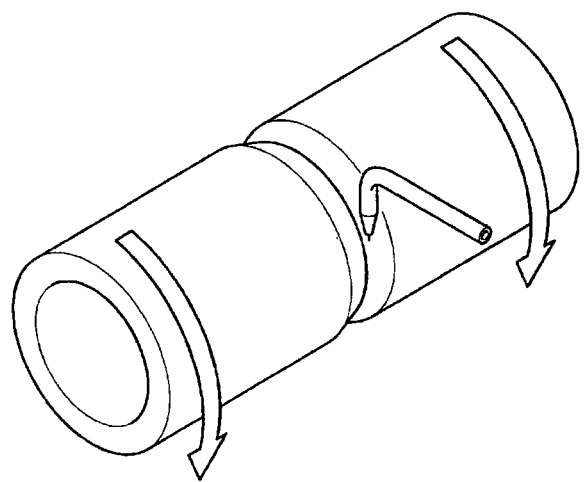

That is, in addition to the butt joint welding of plates in the vertical attitude illustrated in FIG. 10A, the present invention may be applied to corner welding illustrated in FIG. 10B, fillet welding of a T joint illustrated in FIG. 10C, groove welding of a T joint illustrated in FIG. 10D, groove welding of a cylindrical pipe and a flange illustrated in FIG. 10E, circumferential butt welding of two cylindrical pipes illustrated in FIG. 10F, and the like. In FIGS. 10A to 10D, vertical-up welding is realized by performing welding in directions indicated by illustrated hollow arrows. On the other hand, in FIGS. 10E and 10F, relative vertical welding is realized by performing welding on base metals rotating in directions indicated by illustrated hollow arrows while fixing welding torches at a 3 o'clock position. In the relative vertical welding, however, the control of the rising speed realized by a lifting motor using values of current is replaced by control of the rotation speed of a base metal using values of current.

Figure 11A:
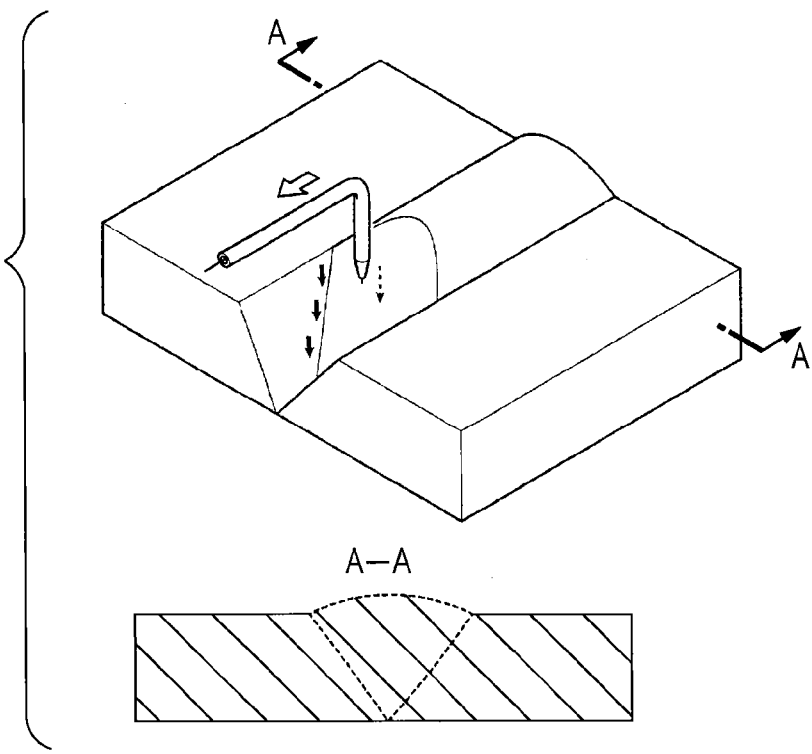
FIGS. 11A and 11B are schematic diagrams illustrating a welding direction, an arc force direction, and a penetration direction in each welding attitude.
Figure 11B:
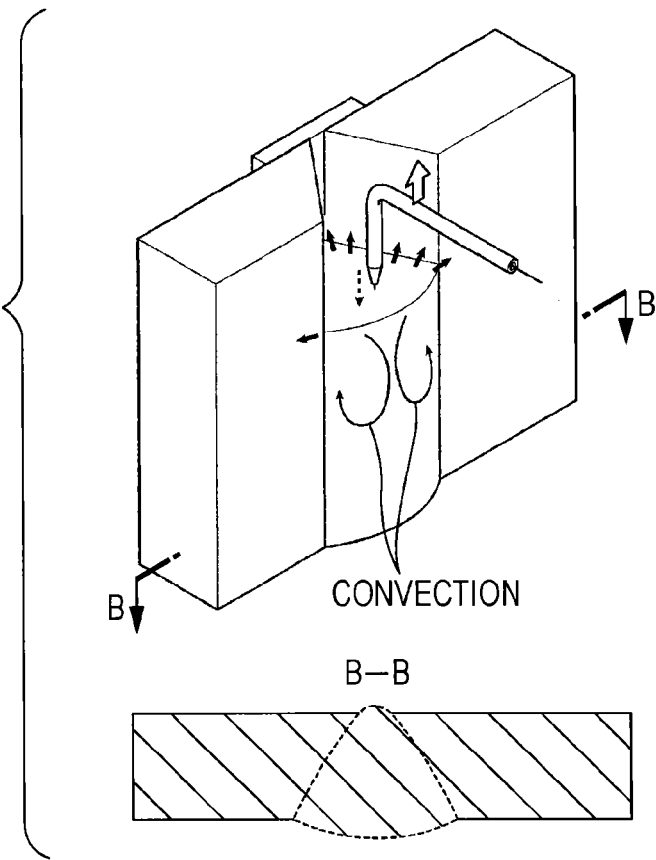
Figure 12A:
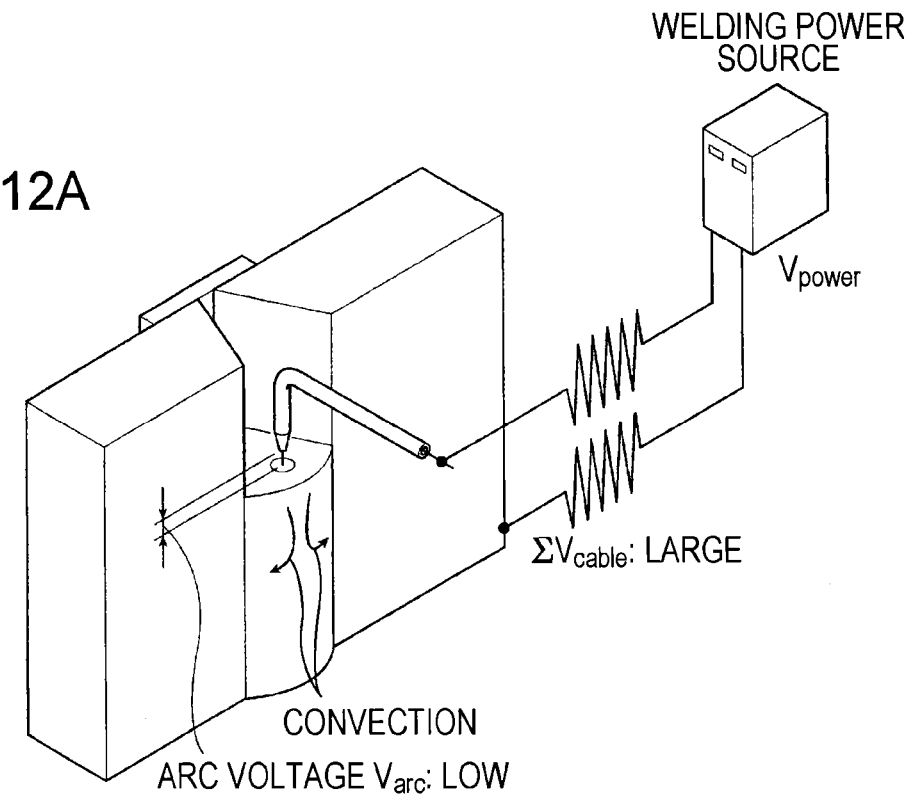
FIGS. 12A and 12B are diagrams illustrating relationships between power source output voltage, arc voltage, and a voltage loss in cables.
Figure 12B:
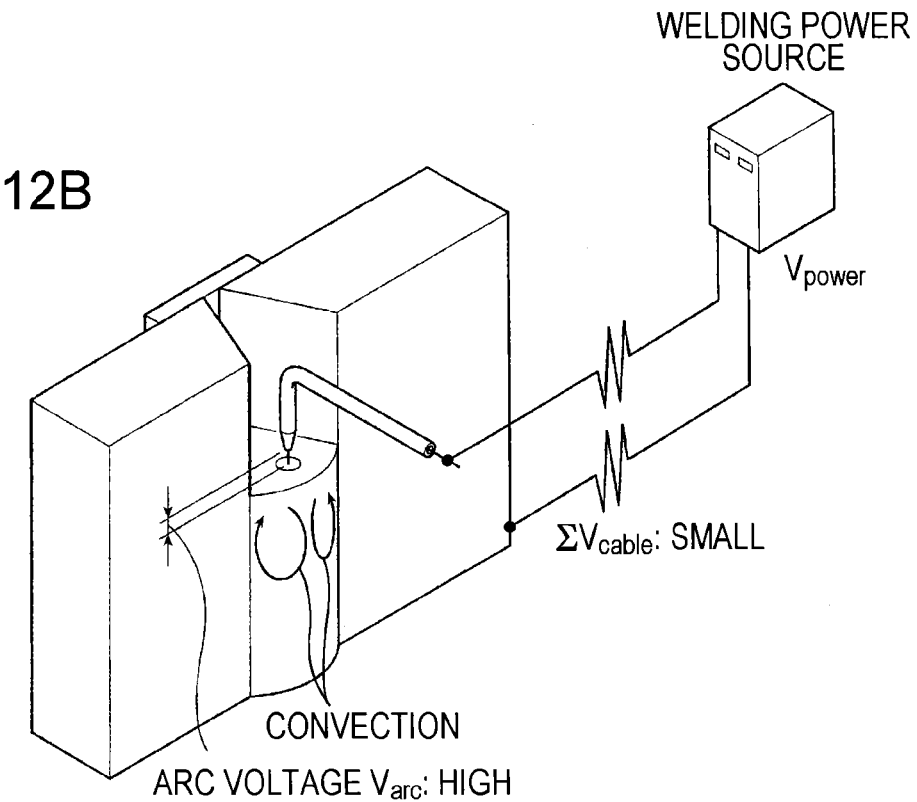

Although the inventors have tested the mechanisms according to the present embodiments in downhand welding and horizontal welding, which are two of the most general types of welding, the mechanisms have not produced advantageous effects, which has indicated that the mechanisms according to the present embodiments are particularly effective in vertical-up welding. This is probably because of the following reason. That is, in vertical-up welding, because the molten pool P is completely surrounded by the groove G, the backing material 13, and the sliding copper plate 14, which means that no escape is possible, and the rising speed is low, a distance between the surface of the molten pool P and the welding wire may be stably maintained, and accordingly the control is likely to become more and more accurate over time, thereby making the mechanisms effective. On the other hand, in downhand welding and horizontal welding, as can be seen from FIG. 11A, since there is no object that physically blocks the molten pool in the moving direction of the arc, the molten pool is likely to irregularly flow forward due to gravity and accordingly a distance between the welding wire and the surface of the molten pool immediately below the welding wire continuously varies, which affects the control such that the control becomes inaccurate, thereby causing a large variation in the arc length. That is, the mechanisms according to the present embodiments presuppose that the position of the surface of the molten pool can be stably maintained. Therefore, in the present embodiments, it is desirable to control not only the voltage but also the rising speed through sampling of the current.

In addition, gas-shielded arc welding, which is one of the most general types of welding, is a type of welding to which the present embodiments may be applied. In the gas-shielded arc welding, a solid wire or a flux-cored wire is used as the welding wire, and carbonic acid gas or a mixed gas of argon and carbonic acid gas is blown onto the surface of the molten pool P in order to separate the molten pool P from the atmosphere and secure soundness. Alternatively, the present embodiments may be applied to non-gas-shielded arc welding. The non-gas-shielded arc welding is also called self-shielded arc welding, in which a dedicated flux-cored wire is used as the welding wire to perform welding without using shielding gas. Although there are some disadvantages in that the amount of fumes generated is large and the toughness of the weld metal is low compared to that in the gas-shielded arc welding, the non-gas-shielded arc welding requires no maintenance of a gas feed system and a gas supply port and equipment such as a gas cylinder or a gas tank is not necessary, which are advantageous. The non-gas-shielded arc welding is more preferable than the gas-shielded arc welding in a windy environment.

Thus, the following advantageous effects may be produced by the present embodiments.

That is, in the vertical welding apparatuses in the related art, for example, when the configuration of equipment has been changed in accordance with an installation environment or when a failure in the setting of the welding conditions has occurred unconsciously or due to the skill of the operator, adverse effects on the welding quality are inevitable, and the operator needs to adjust the configuration by trial and error. Therefore, the operator needs to stay at the welding site over a long period of time. However, in the vertical welding apparatuses according to the present embodiments, the arc length, which may significantly affect the welding quality, may be automatically adjusted to an optimal value. Therefore, thanks to the automatic adjustment function, the operator may leave the welding site after generating an arc and starting the apparatus, thereby improving the quality and reducing costs, which is significantly advantageous.

Now, the limitation of values such as the parameters used in the present embodiments and the reasons for the limitation will be described.

First, the set number of times $N_{set}$ will be described.

A small set number of times $N_{set}$ means that the control is to be performed such that the number of short circuits becomes small, that is, the arc length becomes large. When the arc length is large, the penetration becomes deep. However, when the arc length is too large, phenomena such as excessive oxidization of alloy elements of the weld metal and mixing of the atmosphere in the arc may occur, which deteriorates the properties of the weld metal. If $V_{short}=15$ V, these phenomena are likely to occur when the set number of times $N_{set}$ is smaller than 3.

On the other hand, a large set number of times $N_{set}$ means that the control is performed such that the number of short circuits becomes large, that is, the arc length becomes small. When the arc length is small, the mechanical properties of the weld metal improve. However, when the arc length is too small, the convection in the molten pool P becomes weak, which causes failures in the penetration. If $V_{short}=15$ V, this phenomenon is likely to occur when the set number of times $N_{set}$ is larger than 60.

Therefore, the set number of times $N_{set}$ is desirably 3 to 60 times per second. By strictly setting the set number of times $N_{set}$ to 5 to 20 times per second, the properties of the weld metal and the depth of penetration are more balanced.

The same holds true for the set numbers of times $N_{set1}$ and $N_{set2}$.

Next, the set time $T_{set}$ will be described.

A short set time $T_{set}$ means that short circuits last only short periods of time (only small short circuits occur), that is, the arc length becomes large. When the arc length is large, the penetration becomes large. However, when the arc length is too large, phenomena such as excessive oxidization of the alloy elements of the weld metal and mixing of the atmosphere in the arc may occur, which deteriorates the properties of the weld metal. If $V_{short}=15$ V, these phenomena are likely to occur when the set time $T_{set}$ is shorter than 0.1 ms.

On the other hand, a long set time $T_{set}$ means that short circuits last long periods of time (the magnitude of short circuits is large), that is, the arc length becomes small. When the arc length is small, the mechanical properties of the weld metal improve. However, when the arc length is too small, the convection in the molten pool P becomes weak, which causes failures in the penetration. If $V_{short}=15$ V, this phenomenon is likely to occur when the set time $T_{set}$ is longer than 1.0 ms.

Therefore, the set time $T_{set}$ is desirably 0.1 to 1.0 ms. By strictly setting the set time $T_{set}$ to 0.2 to 0.5 ms, the properties of the weld metal and the depth of penetration are more balanced.

The same holds true for the set times $T_{set1}$ and $T_{set2}$.

Next, the rising speed $S_{up}$ determined by the lifting motor 16 will be described.

In the present embodiments, since a routine including sampling of voltage, an analysis, a determination, and an output voltage instruction to the welding power source 30 (30a and 30b) and a routine including sampling of current, a determination, a lifting speed instruction to the lifting motor 16 are simultaneously repeated in order to stabilize the arc length, the control becomes more effective as the surface of the molten pool P becomes smoother and more stable. Since the rising directions of the welder and the molten pool P and the direction of the arc length are the same, the decrease in the arc length in routine periods becomes larger as the rising speed $S_{up}$ becomes higher. Therefore, the degree of correction realized as a result of the control according to the present embodiments becomes high and rough, thereby making it difficult for the arc length to be appropriate.

Because of the above-described mechanism, the control for stabilizing the arc length becomes more desirable when the rising speed $S_{up}$ is smaller. More specifically, the control according to the present embodiments becomes effective when the rising speed $S_{up}$ is lower than or equal to 180 mm/min. By setting the rising speed $S_{up}$ to be lower than or equal to 120 mm/min, the arc length may be maintained more properly. Therefore, it is desirable to set the rising speed $S_{up}$ to be lower than or equal to 120 mm/min. Such rising speed $S_{up}$ is sufficiently practical in vertical welding.

EXAMPLES

Next, examples of the present invention will be described while comparing the examples with comparative examples that fall out of the scope of the present invention. The examples and the comparative examples provide reasons to use the above-described limitation of values.

First Examples

One-Electrode Type

Vertical-up welding was performed using JIS G3106 SM490B carbon steel plates having a thickness of 12 mm as steel plates while performing groove processing such that a 50° V-groove and a root gap of 5 mm were obtained. Gas-shielded arc welding was applied, a JIS Z3319 YFEG-22C flux-cored wire having a diameter of 1.6 mm was used as the welding wire, and $CO_2$ was used as the shielding gas. The welding apparatus used the configuration illustrated in FIG. 3 or 4. Welding of a welding length of 500 mm was performed while changing the welding conditions and the determination conditions, and, after the welding, an ultrasonic flaw detection test for evaluating the penetration and a Charpy impact test of the center of a cross-section, which is one of methods for evaluating the properties of a weld metal, were performed. In the ultrasonic flaw detection test, a double circle was entered when there had been no failure in the penetration, a circle was entered when there had been one to three failures in the penetration, and an X mark was entered when there had been four or more failures in the penetration. In the Charpy impact test, under a test temperature of −20° C., a double circle was entered when a Charpy impact value had been equal to or larger than 47 J, a circle was entered when the Charpy impact value had been equal to or larger than 27 J but smaller than 47 J, and an X mark was entered when the Charpy impact value had been smaller than 27 J.

Results of the tests are indicated in the table below. In the table, conditions different from the base conditions are indicated in bold italic characters, and results of the ultrasonic flaw detection tests and the Charpy impact tests that pose problems are indicated in bold characters surrounded by bold frames.

TABLE 1

| Category | No. | Configuration used | Type of welding | Polarity of current | Total length of secondary cables (m) | Current $I_{set}$ (A) | Rising speed (mm/min) |
|---|---|---|---|---|---|---|---|
| | A1 | FIG. 3 | Gas-shielded arc | ⊕ | 25 | 350 | 120 |
| | A2 | FIG. 3 | Gas-shielded arc | ⊕ | 25 | 350 | 120 |
| | A3 | FIG. 4 | Gas-shielded arc | ⊕ | 25 | 350 | 120 |
| Example | A4 | FIG. 3 | Gas-shielded arc | ⊕ | 50 | 350 | 120 |
| Example | A5 | FIG. 3 | Gas-shielded arc | ⊕ | 50 | 350 | 120 |
| Comparative example | A6 | FIG. 4 | Gas-shielded arc | ⊕ | 50 | 350 | 120 |
| Example | A7 | FIG. 3 | Gas-shielded arc | ⊕ | 10 | 350 | 120 |
| Example | A8 | FIG. 3 | Gas-shielded arc | ⊕ | 10 | 350 | 120 |
| Comparative example | A9 | FIG. 4 | Gas-shielded arc | ⊕ | 10 | 350 | 120 |
| Example | A10 | FIG. 3 | Gas-shielded arc | ⊕ | 25 | 350 | 120 |
| Example | A11 | FIG. 3 | Gas-shielded arc | ⊕ | 25 | 350 | 120 |
| Comparative example | A12 | FIG. 4 | Gas-shielded arc | ⊕ | 25 | 350 | 120 |
| Example | A13 | FIG. 3 | Gas-shielded arc | ⊕ | 25 | 350 | 120 |
| Example | A14 | FIG. 3 | Gas-shielded arc | ⊕ | 25 | 350 | 120 |
| Comparative example | A15 | FIG. 4 | Gas-shielded arc | ⊕ | 25 | 350 | 120 |
| Example | A16 | FIG. 3 | Gas-shielded arc | ⊕ | 25 | 350 | 120 |
| Example | A17 | FIG. 3 | Gas-shielded arc | ⊕ | 25 | 350 | 120 |
| Example | A18 | FIG. 3 | Gas-shielded arc | ⊕ | 25 | 350 | 120 |
| Example | A19 | FIG. 3 | Gas-shielded arc | ⊕ | 25 | 350 | 120 |
| Example | A20 | FIG. 3 | Gas-shielded arc | ⊕ | 25 | 400 | 180 |
| Comparative example | A21 | FIG. 3 | Gas-shielded arc | ⊕ | 25 | 420 | 200 |

| Category | No. | Voltage $V_{set}$ (V) | Determination voltage $V_{short}$ (V) | Set number of times $N_{set}$ (times/s) | Set time $T_{set}$ (ms) | Result of ultrasonic flaw detection test | Result of Charpy impact test (J) |
|---|---|---|---|---|---|---|---|
| | A1 | 34 | 15 | 10 | — | 0⊙ | -20° C.:60⊙ |
| | A2 | 34 | 15 | — | 0.3 | 0⊙ | -20° C.:61⊙ |
| | A3 | 34 | — | — | — | 0⊙ | -20° C.:59⊙ |
| Example | A4 | 34 | 15 | 10 | — | 0⊙ | -20° C.:60⊙ |
| Example | A5 | 34 | 15 | — | 0.3 | 0⊙ | -20° C.:62⊙ |
| Comparative example | A6 | 34 | — | — | — | 11× | -20° C.:76⊙ |
| Example | A7 | 34 | 15 | 10 | — | 0⊙ | -20° C.:61⊙ |
| Example | A8 | 34 | 15 | — | 0.3 | 0⊙ | -20° C.:63⊙ |
| Comparative example | A9 | 34 | — | — | — | 0⊙ | -20° C.:22× |
| Example | A10 | 31 | 15 | 10 | — | 0⊙ | -20° C.:60⊙ |
| Example | A11 | 31 | 15 | — | 0.3 | 0⊙ | -20° C.:61⊙ |
| Comparative example | A12 | 31 | — | — | — | 9× | -20° C.:74⊙ |
| Example | A13 | 37 | 15 | 10 | — | 0⊙ | -20° C.:60⊙ |
| Example | A14 | 37 | 15 | — | 0.3 | 0⊙ | -20° C.:61⊙ |
| Comparative example | A15 | 37 | — | — | — | 0⊙ | -20° C.:19⊙ |
| Example | A16 | 34 | 15 | 5 | — | 0⊙ | -20° C.:47⊙ |
| Example | A17 | 34 | 15 | 3 | — | 0⊙ | -20° C.:27⊙ |
| Example | A18 | 34 | 15 | 20 | — | 0⊙ | -20° C.:68⊙ |
| Example | A19 | 34 | 15 | 60 | — | 3○ | -20° C.:72⊙ |
| Example | A20 | 35 | 15 | — | 0.3 | 3○ | -20° C.:62⊙ |
| Comparative example | A21 | 36 | 15 | — | 0.3 | 6× | -20° C.:60⊙ |

No. A1 is a case in which the arc length was controlled on the basis of the number of short circuits using the configuration illustrated in FIG. 3. No. A2 is a case in which the arc length was controlled on the basis of the average short circuit period using the configuration illustrated in FIG. 3. No. A3 is a case in which the configuration illustrated in FIG. 4, which does not include a voltage adjustment circuit for controlling the arc length, was used. In No. A1 to No. A3, setting was made such that the arc length became optimal when the length of the secondary cables was 25 m. Results of the ultrasonic flaw detection tests and the Charpy impact tests performed in No. A1 to No. A3 posed no problems.

No. A4 to No. A6 are cases in which the length of the secondary cables was extended to 50 m while using the above-described setting as a reference. In No. A4 and No. A5, in which the configuration illustrated in FIG. 3 was used, the arc length remained optimal since the arc length was automatically controlled even under the welding conditions at a time when the length of the secondary cables is 25 m. Accordingly, results of the ultrasonic flaw detection tests and the Charpy impact tests posed no problems. On the other hand, in No. A6, in which the configuration illustrated in FIG. 4 was used, the arc voltage became relatively low since the secondary cables became longer and the voltage loss in the secondary cables became larger. Accordingly, the convection in the molten pool became weaker and the penetration became shallower, thereby causing a lot of failures in the ultrasonic flaw detection test.

In contrast, No. A7 to No. A9 are cases in which the length of the secondary cables was reduced to 10 m. In No. A7 and No. A8, in which the configuration illustrated in FIG. 3 was used, the arc length remained optimal since the arc length was automatically controlled even under the welding conditions at a time when the length of the secondary cables is 25 m. Accordingly, results of the ultrasonic flaw detection tests and the Charpy impact tests posed no problems. On the other hand, in No. A9, in which the configuration illustrated in FIG. 4 was used, the arc voltage became relatively high since the secondary cables became shorter and the voltage loss in the secondary cables became smaller. Accordingly, the arc length became too large, and phenomena such as excessive oxidization of the alloy elements of the weld metal and mixing of the atmosphere in the arc occurred, which deteriorated the performance of the weld metal in the Charpy impact test.

No. A10 to No. A12 are cases in which voltage was set lower than that in No. $A_1$ to No. A3 by mistake. In No. A10 and No. A11, in which the configuration illustrated in FIG. 3 was used, the arc length was momentarily unstable during the arc startup, but thereafter the welding was performed using an optimal arc length since the voltage setting was used only as an arc startup condition and the arc length was controlled immediately. Therefore, the soundness of the penetration and the weld metal was maintained. On the other hand, in No. A12, in which the configuration illustrated in FIG. 4 was used, because the welding was performed under the low voltage condition set by mistake, the convection in the molten pool became weaker and the penetration became shallower, thereby causing a lot of failures in the ultrasonic flaw detection test.

No. A13 to No. A15 are cases in which voltage was set higher than that in No. A1 to A3 by mistake. In No. A13 and No. A14, in which the configuration illustrated in FIG. 3 was used, the arc length was momentarily unstable during the arc startup, but thereafter the welding was performed using an optimal arc length since the voltage setting was used only as an arc startup condition and the arc length was controlled immediately. Therefore, the soundness of the penetration and the weld metal was maintained. On the other hand, in No. A15, in which the configuration illustrated in FIG. 4 was used, because the welding was performed under the high voltage condition set by mistake, the arc length became too large, and phenomena such as excessive oxidization of the alloy elements of the weld metal and mixing of the atmosphere in the arc occurred, which deteriorated the performance of the weld metal in the Charpy impact test.

No. A16 to No. A19 are cases in which the set number of times $N_{set}$, which is a threshold for the number of short circuits, was different from that in No. A1. In No. A16 and No. A18, in which the set number of times $N_{set}$ was within the most desirable range, the penetration performance and the properties of the weld metal were satisfactory. In No. A17, however, in which the set number of times net was set low, the arc length became slightly too large, and the Charpy impact test was passed but the Charpy impact value was relatively small. On the other hand, in No. A19, in which the set number of times $N_{set}$ was set high, the arc length became slightly too small, and the ultrasonic flow detection test was passed but a small number of failures occurred.

No. A20 is a case in which an upper limit value of the rising speed allowed in the welding using the configuration illustrated in FIG. 3 was used. The control of the arc length was effective, and results of the ultrasonic flow detection test and the Charpy impact test were relatively satisfactory. In No. A21, however, in which a value of rising speed exceeding the range allowed in the welding using the configuration illustrated in FIG. 3 was used, the control of the arc length was not able to come up with the rising speed of the surface of the molten pool, and accordingly the arc length and the penetration became unstable, thereby failing the ultrasonic flow detection test.

Second Examples

One-Electrode Type

As with the first examples, vertical-up welding was performed using JIS G3106 SM490B carbon steel plates having a thickness of 12 mm as steel plates while performing groove processing such that a 50° V-groove and a root gap of 5 mm were obtained. Non-gas-shielded arc welding was applied, and a JIS Z3313 T49YT4-0NA wire having a diameter of 2.4 mm was used as the welding wire. The welding apparatus used the configuration illustrated in FIG. 3 or 4. Welding of a welding length of 500 mm was performed while changing the welding conditions and the determination conditions, and, after the welding, the ultrasonic flaw detection test for evaluating the penetration and the Charpy impact test of the center of a cross-section, which is one of methods for evaluating a weld metal, were performed. In the ultrasonic flaw detection test, a double circle was entered when there had been no failure in the penetration, a circle was entered when there had been one to three failures in the penetration, and an X mark was entered when there had been four or more failures in the penetration. In the Charpy impact test, under a test temperature of +20° C., a double circle was entered when the Charpy impact value had been equal to or larger than 47 J, a circle was entered when the Charpy impact value had been equal to or larger than 27 J but smaller than 47 J, and an X mark was entered when the Charpy impact value had been smaller than 27 J.

Results of the tests are indicated in the table below. In the table, conditions different from the base conditions are indicated in bold italic characters, and results of the ultrasonic flaw detection tests and the Charpy impact tests that pose problems are indicated in bold characters surrounded by bold frames.

TABLE 2

| Category | No. | Configuration used | Type of welding | Polarity of current | Total length of secondary cables (m) | Current $I_{set}$ (A) | Rising speed (mm/min) |
|---|---|---|---|---|---|---|---|
| | B1 | FIG. 3 | Non-gas-shielded arc | ⊕ | 25 | 300 | 60 |
| | B2 | FIG. 3 | Non-gas-shielded arc | ⊕ | 25 | 300 | 60 |
| | B3 | FIG. 4 | Non-gas-shielded arc | ⊕ | 25 | 300 | 60 |
| Example | B4 | FIG. 3 | Non-gas-shielded arc | ⊕ | 50 | 300 | 60 |
| Example | B5 | FIG. 3 | Non-gas-shielded arc | ⊕ | 50 | 300 | 60 |
| Comparative example | B6 | FIG. 4 | Non-gas-shielded arc | ⊕ | 50 | 300 | 60 |
| Example | B7 | FIG. 3 | Non-gas-shielded arc | ⊕ | 25 | 300 | 60 |
| Example | B8 | FIG. 3 | Non-gas-shielded arc | ⊕ | 25 | 300 | 60 |
| Example | B9 | FIG. 3 | Non-gas-shielded arc | ⊕ | 25 | 300 | 60 |
| Example | B10 | FIG. 3 | Non-gas-shielded arc | ⊕ | 25 | 300 | 60 |
| Example | B11 | FIG. 3 | Non-gas-shielded arc | ⊖ | 25 | 300 | 70 |

| Category | No. | Voltage $V_{set}$ (V) | Determination voltage $V_{short}$ (V) | Set number of times $N_{set}$ (times/s) | Set time $T_{set}$ (ms) | Result of ultrasonic flaw detection test | Result of Charpy impact test (J) |
|---|---|---|---|---|---|---|---|
| | B1 | 26 | 15 | 10 | — | 0◉ | +20° C.:55◉ |
| | B2 | 26 | 15 | — | 0.3 | 0◉ | +20° C.:56◉ |
| | B3 | 26 | — | — | — | 0◉ | +20° C.:52◉ |
| Example | B4 | 26 | 15 | 10 | — | 0◉ | +20° C.:55◉ |
| Example | B5 | 26 | 15 | — | 0.3 | 0◉ | +20° C.:58◉ |
| Comparative example | B6 | 26 | — | — | — | 14× | +20° C.:62◉ |
| Example | B7 | 26 | 15 | — | 0.2 | 0◉ | +20° C.:48◉ |
| Example | B8 | 26 | 15 | — | 0.1 | 0◉ | +20° C.:28◉ |
| Example | B9 | 26 | 15 | — | 0.5 | 0◉ | +20° C.:62◉ |
| Example | B10 | 26 | 15 | — | 1.0 | 3○ | +20° C.:65◉ |
| Example | B11 | 24 | 15 | 10 | — | 0◉ | +20° C.:60◉ |

No. B1 is a case in which the arc length was controlled on the basis of the number of short circuits using the configuration illustrated in FIG. 3. No. B2 is a case in which the arc length was controlled on the basis of the average short circuit period using the configuration illustrated in FIG. 3. No. B3 is a case in which the configuration illustrated in FIG. 4, which does not include a voltage adjustment circuit for controlling the arc length, was used. In No. B1 to No. B3, setting was made such that the arc length became optimal when the length of the secondary cables was 25 m. Results of the ultrasonic flaw detection tests and the Charpy impact tests performed in No. B1 to No. B3 posed no problems.

No. B4 to No. B6 are cases in which the length of the secondary cables was extended to 50 m while using the above-described setting as a reference. In No. B4 and No. B5, in which the configuration illustrated in FIG. 3 was used, the arc length remained optimal since the arc length was automatically controlled even under the welding conditions at a time when the length of the secondary cables is 25 m. Accordingly, results of the ultrasonic flaw detection tests and the Charpy impact tests posed no problems. On the other hand, in No. B6, in which the configuration illustrated in FIG. 4 was used, the arc voltage became relatively low since the secondary cables became longer and the voltage loss in the secondary cables became larger. Accordingly, the convection in the molten pool became weaker and the penetration became shallower, thereby causing a lot of failures in the ultrasonic flaw detection test.

No. B7 to No. B10 are cases in which the set time $T_{set}$, which is a threshold for the average short circuit period, was different from that in No. B2. In No. B7 and No. B9, in which the set time $T_{set}$ was within the most desirable range, the penetration performance and the properties of the weld metal were satisfactory. In No. B8, however, in which the set time $T_{set}$ was set short, the arc length became slightly too large, and the Charpy impact test was passed but the Charpy impact value was relatively small. On the other hand, in No. B10, in which the set time $T_{set}$ was set long, the arc length became slightly too small, and the ultrasonic flow detection test was passed but a small number of failures occurred.

The conditions in No. B11 were similar to those in No. B1, but the polarity of current was electrode negative, that is, so-called straight polarity. The rising speed was also different since the wire melting rate changes when the polarity has changed, but the control of the arc length according to the embodiments was effective and posed no problem. The penetration performance and the properties of the weld metal that had been obtained posed no problems, either.

Third Examples

Two-Electrode Type

Vertical-up welding was performed using JIS G3106 SM490C carbon steel plates having a thickness of 80 mm as steel plates while performing groove processing such that a 20° V-groove and a root gap of 8 mm were obtained. Gas-shielded arc welding was applied, two JIS Z3319 YFEG-22C flux-cored wires having a diameter of 1.6 mm were used as the welding wires, and $CO_2$ was used as the shielding gas. The welding apparatus used the configuration illustrated in FIG. 5 or 6, in which two electrode arcs form one molten pool and simultaneously rise. Welding of a welding length of 500 mm was performed while changing the welding conditions and the determination conditions, and, after the welding, the ultrasonic flaw detection test for evaluating the penetration and the Charpy impact test of the center of a cross-section, which is one of methods for evaluating a weld metal, were performed. In the ultrasonic flaw detection test, a double circle was entered when there had been no failure in the penetration, a circle was entered when there had been one to three failures in the penetration, and an X mark was entered when there had been four or more failures in the penetration. In the Charpy impact test, under a test temperature of −20° C., a double circle was entered when the Charpy impact value had been equal to or larger than 47 J, a circle was entered when the Charpy impact value had been equal to or larger than 27 J but smaller than 47 J, and an X mark was entered when the Charpy impact value had been smaller than 27 J.

Results of the tests are indicated in the table below. In the table, conditions different from the base conditions are indicated in bold italic characters, and results of the ultrasonic flaw detection tests and the Charpy impact tests that pose problems are indicated in bold characters surrounded by bold frames.

No. C1 is a case in which the two arc lengths were independently controlled on the basis of the numbers of short circuits using the configuration illustrated in FIG. 5. No. C2 is a case in which the two arc lengths were independently controlled on the basis of the average short circuit periods using the configuration illustrated in FIG. 5. No. C3 is a case in which the configuration illustrated in FIG. 6, which does not include voltage adjustment circuits for controlling the two arc lengths, was used. The rising speed of the welder was controlled by values of current sampled by the power supply system connected to the closer electrode. In No. C1 to C3, setting was made such that the arc length became optimal when the length of the secondary cables was 25 m. Results of the ultrasonic flaw detection tests and the Charpy impact tests performed in No. C1 to No. C3 posed no problems.

No. C4 to No. C6 are cases in which the length of the secondary cables was extended to 50 m while using the above-described setting as a reference. In No. C4 and No. C5, in which the configuration illustrated in FIG. 5 was used, the arc length remained optimal since the arc length was automatically controlled even under the welding conditions at a time when the length of the secondary cables is 25 m. Accord-

TABLE 3

| Category | No. | Configuration used | Type of welding | Polarity of current | Total length of secondary cables (m) | Current $I_{set}$ (A) | Rising speed (mm/min) |
|---|---|---|---|---|---|---|---|
| | C1 | FIG. 5 | Gas-shielded arc | Far ⊖ | 25 | 400 | 30 |
| | | | | Close ⊕ | 25 | 390 | |
| | C2 | FIG. 5 | Gas-shielded arc | Far ⊖ | 25 | 400 | 30 |
| | | | | Close ⊕ | 25 | 390 | |
| | C3 | FIG. 6 | Gas-shielded arc | Far ⊖ | 25 | 400 | 30 |
| | | | | Close ⊕ | 25 | 390 | |
| Example | C4 | FIG. 5 | Gas-shielded arc | Far ⊖ | 50 | 400 | 30 |
| | | | | Close ⊕ | 50 | 390 | |
| Example | C5 | FIG. 5 | Gas-shielded arc | Far ⊖ | 50 | 400 | 30 |
| | | | | Close ⊕ | 50 | 390 | |
| Comparative example | C6 | FIG. 6 | Gas-shielded arc | Far ⊖ | 50 | 400 | 30 |
| | | | | Close ⊕ | 50 | 390 | |
| Example | C7 | FIG. 5 | Gas-shielded arc | Far ⊖ | 10 | 400 | 30 |
| | | | | Close ⊕ | 10 | 390 | |
| Example | C8 | FIG. 5 | Gas-shielded arc | Far ⊖ | 10 | 400 | 30 |
| | | | | Close ⊕ | 10 | 390 | |
| Comparative example | C9 | FIG. 6 | Gas-shielded arc | Far ⊖ | 10 | 400 | 30 |
| | | | | Close ⊕ | 10 | 390 | |

| Category | No. | Voltage $V_{set}$ (V) | Determination voltage $V_{short}$ (V) | Set number of times $N_{set}$ (times/s) | Set time $T_{set}$ (ms) | Result of ultrasonic flaw detection test | Result of Charpy impact test (J) |
|---|---|---|---|---|---|---|---|
| | C1 | 41 | 15 | 10 | — | 0 ⊙ | -20° C.:58 ⊙ |
| | | 43 | 15 | 10 | — | | |
| | C2 | 41 | 15 | — | 0.3 | 0 ⊙ | -20° C.:59 ⊙ |
| | | 43 | 15 | — | 0.3 | | |
| | C3 | 41 | — | — | — | 0 ⊙ | -20° C.:57 ⊙ |
| | | 43 | — | — | — | | |
| Example | C4 | 41 | 15 | 10 | — | 0 ⊙ | -20° C.:58 ⊙ |
| | | 43 | 15 | 10 | — | | |
| Example | C5 | 41 | 15 | — | 0.3 | 0 ⊙ | -20° C.:60 ⊙ |
| | | 43 | 15 | — | 0.3 | | |
| Comparative example | C6 | 41 | — | — | — | 9× | -20° C.:74 ⊙ |
| | | 43 | — | — | — | | |
| Example | C7 | 41 | 15 | 10 | — | 0 ⊙ | -20° C.:61 ⊙ |
| | | 43 | 15 | 10 | — | | |
| Example | C8 | 41 | 15 | — | 0.3 | 0 ⊙ | -20° C.:63 ⊙ |
| | | 43 | 15 | — | 0.3 | | |
| Comparative example | C9 | 41 | — | — | — | 0 ⊙ | -20° C.:25× |
| | | 43 | — | — | — | | | ingly, results of the ultrasonic flaw detection tests and the Charpy impact tests posed no problems. On the other hand, in No. C6, in which the configuration illustrated in FIG. 6 was used, the arc voltage became relatively low since the secondary cables became longer and the voltage loss in the secondary cables became larger. Accordingly, the convection in the molten pool became weaker and the penetration became smaller, thereby causing a lot of failures in the ultrasonic flaw detection test.

In contrast, No. C7 to No. C9 are cases in which the length of the secondary cables was reduced to 10 m. In No. C7 and No. C8, in which the configuration illustrated in FIG. 5 was used, the arc length remained optimal since the arc length was automatically controlled even under the welding conditions at a time when the length of the secondary cables is 25 m. Accordingly, results of the ultrasonic flaw detection tests and the Charpy impact tests posed no problems. On the other hand, in No. C9, in which the configuration illustrated in FIG. 6 was used, the arc voltage became relatively high since the secondary cables became shorter and the voltage loss in the secondary cables became smaller. Accordingly, the arc length became too large, and phenomena such as excessive oxidization of the alloy elements of the weld metal and mixing of the atmosphere in the arc occurred, which deteriorated the performance of the weld metal in the Charpy impact test.

Fourth Examples

Two-Electrode Type

As with the third examples, vertical-up welding was performed using JIS G3106 SM490C carbon steel plates having a thickness of 80 mm as steel plates while performing groove processing such that a 20° V-groove and a root gap of 8 mm were obtained. Gas-shielded arc welding was applied, two JIS Z3319 YFEG-22C flux-cored wires having a diameter of 1.6 mm were used as the welding wires, and $CO_2$ was used as the shielding gas. The welding apparatus used the configuration illustrated in FIG. 5 or 6, in which two electrode arcs form one molten pool and simultaneously rise. Welding of a welding length of 500 mm was performed while changing the welding conditions and the determination conditions, and, after the welding, the ultrasonic flaw detection test for evaluating the penetration and the Charpy impact test of the center of a cross-section, which is one of methods for evaluating a weld metal, were performed. In the ultrasonic flaw detection test, a double circle was entered when there had been no failure in the penetration, a circle was entered when there had been one to three failures in the penetration, and an X mark was entered when there had been four or more failures in the penetration. In the Charpy impact test, under a test temperature of −20° C., a double circle was entered when the Charpy impact value had been equal to or larger than 47 J, a circle was entered when the Charpy impact value had been equal to or larger than 27 J but smaller than 47 J, and an X mark was entered when the Charpy impact value had been smaller than 27 J.

Results of the tests are indicated in the table below. In the table, conditions different from the base conditions are indicated in bold italic characters, and results of the ultrasonic flaw detection tests and the Charpy impact tests that pose problems are indicated in bold characters surrounded by bold frames.

TABLE 4

| Category | No. | Configuration used | Type of welding | Polarity of current | Total length of secondary cables (m) | Current $I_{set}$ (A) | Rising speed (mm/min) |
|---|---|---|---|---|---|---|---|
| | D1 | FIG. 5 | Gas-shielded arc | Far ⊕ | 25 | 350 | 22 |
| | | | | Close ⊕ | 25 | 330 | |
| | D2 | FIG. 6 | Gas-shielded arc | Far ⊕ | 25 | 350 | 22 |
| | | | | Close ⊕ | 25 | 330 | |
| Example | D3 | FIG. 5 | Gas-shielded arc | Far ⊕ | 25 | 350 | 22 |
| | | | | Close ⊕ | 25 | 330 | |
| Comparative example | D4 | FIG. 6 | Gas-shielded arc | Far ⊕ | 25 | 350 | 22 |
| | | | | Close ⊕ | 25 | 330 | |
| Example | D5 | FIG. 5 | Gas-shielded arc | Far ⊕ | 25 | 350 | 22 |
| | | | | Close ⊕ | 25 | 330 | |
| Comparative example | D6 | FIG. 6 | Gas-shielded arc | Far ⊕ | 25 | 350 | 22 |

| Category | No. | Voltage $V_{set}$ (V) | Determination voltage $V_{short}$ (V) | Set number of times $N_{set}$ (times/s) | Set time $T_{set}$ (ms) | Result of ultrasonic flaw detection test | Result of Charpy impact test (J) |
|---|---|---|---|---|---|---|---|
| | D1 | 36 | 15 | — | 0.3 | 0⊙ | -20° C.:61⊙ |
| | | 35 | 15 | — | 0.3 | | |
| | D2 | 36 | — | — | — | 0⊙ | -20° C.:60⊙ |
| | | 35 | — | — | — | | |
| Example | D3 | 30 | 15 | — | 0.3 | 0⊙ | -20° C.:61⊙ |
| | | 30 | 15 | — | 0.3 | | |
| Comparative example | D4 | 30 | — | — | — | 10× | -20° C.:70⊙ |
| | | 30 | — | — | — | | |
| Example | D5 | 40 | 15 | — | 0.3 | 0⊙ | -20° C.:61⊙ |
| | | 40 | 15 | — | 0.3 | | |
| Comparative example | D6 | 40 | — | — | — | 0⊙ | -20° C.:22× |

No. D1 is a case in which the two arc lengths were independently controlled on the basis of the average short circuit periods using the configuration illustrated in FIG. 5. No. D2 is a case in which the configuration illustrated in FIG. 6, which does not include voltage adjustment circuits for controlling the two arc lengths, was used. The rising speed of the welder was controlled by values of current sampled by the power supply system connected to the closer electrode. In No. D1 and D2, setting was made such that the arc length became optimal when the length of the secondary cables was 25 m although the combination between electrode polarities was different from that in No. C2 and No. C3. Accordingly, results of the ultrasonic flaw detection tests and the Charpy impact tests performed in No. D1 and No. D2 posed no problems.

No. D3 and No. D4 are cases in which voltage was set lower than that in No. D1 and No. D2 by mistake. In No. D3, in which the configuration illustrated in FIG. 5 was used, the arc length was momentarily unstable during the arc startup, but thereafter the welding was performed using an optimal arc length since the voltage setting was used only as an arc startup condition and the arc length was controlled immediately. Therefore, the soundness of the penetration and the weld metal was maintained. On the other hand, in No. D4, in which the configuration illustrated in FIG. 6 was used, because the welding was performed under the low voltage condition set by mistake, the convection in the molten pool became weaker and the penetration became shallower, thereby causing a lot of failures in the ultrasonic flaw detection test.

No. D5 and No. D6 are cases in which voltage was set higher than that in No. D1 and D2 by mistake. In No. D5, in which the configuration illustrated in FIG. 5 was used, the arc length was momentarily unstable during the arc startup, but thereafter the welding was performed using an optimal arc length since the voltage setting was used only as an arc startup condition and the arc length was controlled immediately. Therefore, the soundness of the penetration and the weld metal was maintained. On the other hand, in No. D6, in which the configuration illustrated in FIG. 6 was used, because the welding was performed under the high voltage condition set by mistake, the arc length became too large and phenomena such as excessive oxidization of the alloy elements of the weld metal and mixing of the atmosphere in the arc occurred, which deteriorated the performance of the weld metal in the Charpy impact test.

What is claimed is:

1. An arc welding apparatus that performs vertical-up welding by generating an arc in a groove between steel plates to be welded and forming a molten pool, the arc welding apparatus comprising:
   welding means for performing arc welding by generating the arc from a welding wire in the groove between the steel plates to be welded in a substantially vertically downward direction and forming the molten pool;
   lifting means for lifting the welding means in a substantially vertically upward direction relative to the steel plates to be welded;
   a welding power source that feeds current to the welding wire to generate the arc;
   speed control means for monitoring current output from the welding power source and, if a value of the output current is smaller than a value of current set in advance, controlling the lifting means such that rising speed of the welding means decreases or, if the value of the output current is larger than the set value of current, controlling the lifting means such that the rising speed of the welding means increases; and
   voltage control means for monitoring voltage output from the welding power source during the welding, obtaining information regarding the number of times that a value of the output voltage falls below a determination voltage, which is set in advance as a determination threshold, or periods for which the value of the output voltage remains below the determination voltage and, if the information regarding the number of times or the periods exceeds a set threshold, controlling the welding power source such that the value of the output voltage increases or, if the information regarding the number of times or the periods is below the set threshold, controlling the welding power source such that the value of the output voltage decreases.

2. The arc welding apparatus according to claim 1,
   wherein the information regarding the number of times that the value of the output voltage falls below the determination voltage or the periods for which the value of the output voltage remains below the determination voltage is the number of times in unit time that the value of the output voltage falls below the determination voltage, and
   wherein the set threshold is the number of times set in advance as the number of times in the unit time.

3. The arc welding apparatus according to claim 2,
   wherein, when the determination voltage is 15 V, the set number of times is any number of times within a range from 3 times per second to 60 times per second.

4. The arc welding apparatus according to claim 1,
   wherein the information regarding the number of times that the value of the output voltage falls below the determination voltage or the periods for which the value of the output voltage remains below the determination voltage is a period obtained on the basis of a predetermined number of periods for which the value of the output voltage remains below the determination voltage, and
   wherein the set threshold is a time set in advance.

5. The arc welding apparatus according to claim 4,
   wherein, when the determination voltage is 15 V, the set time is any time within a range from 0.1 ms to 1.0 ms.

6. The arc welding apparatus according to claim 3,
   wherein the speed control means controls the lifting means such that the rising speed of the welding means becomes lower than or equal to 180 mm/min.

7. An arc welding apparatus that performs vertical-up welding by generating an arc in a groove between steel plates to be welded and forming a molten pool, the arc welding apparatus comprising:
   a backing material mounted across a root gap provided in a back of the groove between the steel plates to be welded;
   welding means for performing arc welding by generating the arc from a welding wire in the groove between the steel plates to be welded in a substantially vertically downward direction and forming the molten pool, the welding means including a welding torch that is arranged in front of the groove between the steel plates to be welded and that supplies the welding wire into the groove, a weaving mechanism that oscillates the welding torch in a width direction of the groove, and a sliding copper plate that relatively slides over front surfaces of the steel plates to be welded in a substantially vertically upward direction;
   lifting means for lifting the welding means in the substantially vertically upward direction relative to the steel plates to be welded;
   a welding power source that feeds current to the welding wire to generate the arc;

speed control means for monitoring current output from the welding power source and, if a value of the output current is smaller than a value of current set in advance, controlling the lifting means such that rising speed of the welding means decreases or, if the value of the output current is larger than the set value of current, controlling the lifting means such that the rising speed of the welding means increases; and voltage control means for monitoring voltage output from the welding power source during the welding, obtaining information regarding the number of times that a value of the output voltage falls below a determination voltage, which is set in advance as a determination threshold, or periods for which the value of the output voltage remains below the determination voltage and, if the information regarding the number of times or the periods exceeds a set threshold, controlling the welding power source such that the value of the output voltage increases or, if the information regarding the number of times or the periods is below the set threshold, controlling the welding power source such that the value of the output voltage decreases.

8. A constant voltage characteristic welding power source used for an arc welding apparatus that performs vertical-up welding by lifting, in a substantially vertically upward direction relative to steel plates to be welded, a welder that performs welding by generating an arc from a welding wire in a groove between the steel plates to be welded in a substantially vertically downward direction and forming a molten pool, the constant voltage characteristic welding power source comprising:

power supply means for feeding current to the welding wire to generate the arc;

speed control means for monitoring current output from the power supply means and, if a value of the output current is smaller than a value of current set in advance, performing control such that rising speed of the welder decreases or, if the value of the output current is larger than the set value of current, performing control such that the rising speed of the welder increases; and voltage control means for monitoring voltage output from the power supply means during the welding, obtaining information regarding the number of times that a value of the output voltage falls below a determination voltage, which is set in advance as a determination threshold, or periods for which the value of the output voltage remains below the determination voltage and, if the information regarding the number of times or the periods exceeds a set threshold, performing control such that the value of the output voltage increases or, if the information regarding the number of times or the periods is below the set threshold, performing control such that the value of the output voltage decreases.

9. A method for performing arc welding in which vertical-up welding is performed by lifting, in a substantially vertically upward direction relative to steel plates to be welded, a welder that performs welding by generating an arc from a welding wire in a groove between the steel plates to be welded in a substantially vertically downward direction and forming a molten pool, the method comprising the steps of:

monitoring current output from a welding power source that feeds current to the welding wire to generate the arc and, if a value of the output current is smaller than a value of current set in advance, performing control such that rising speed of the welder decreases or, if the value of the output current is larger than the set value of current, performing control such that the rising speed of the welder increases; and monitoring voltage output from the welding power source during the welding, obtaining information regarding the number of times that a value of the output voltage falls below a determination voltage, which is set in advance as a determination threshold, or periods for which the value of the output voltage remains below the determination voltage and, if the information regarding the number of times or the periods exceeds a set threshold, performing control such that the value of the output voltage increases or, if the information regarding the number of times or the periods is below the set threshold, performing control such that the value of the output voltage decreases.

* * * * *